(12) United States Patent
Williams et al.

(10) Patent No.: US 10,460,720 B2
(45) Date of Patent: Oct. 29, 2019

(54) GENERATION OF LANGUAGE UNDERSTANDING SYSTEMS AND METHODS

(71) Applicant: Microsoft Technology Licensing, LLC., Redmond, WA (US)

(72) Inventors: Jason Douglas Williams, Seattle, WA (US); Nobal Bikram Niraula, Memphis, TN (US); Pradeep Dasigi, Pittsburgh, PA (US); Aparna Lakshmiratan, Kirkland, WA (US); Geoffrey G. Zweig, Sammamish, WA (US); Andrey Kolobov, Bellevue, WA (US); Carlos Garcia Jurado Suarez, Redmond, WA (US); David Maxwell Chickering, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 14/678,315

(22) Filed: Apr. 3, 2015

(65) Prior Publication Data

US 2016/0196820 A1     Jul. 7, 2016

Related U.S. Application Data

(60) Provisional application No. 62/099,480, filed on Jan. 3, 2015.

(51) Int. Cl.
*G10L 15/18* (2013.01)
*G10L 15/06* (2013.01)
(Continued)

(52) U.S. Cl.
CPC ............ *G10L 15/005* (2013.01); *G10L 15/07* (2013.01); *G10L 15/18* (2013.01); *G10L 15/1822* (2013.01); *G10L 15/22* (2013.01)

(58) Field of Classification Search
CPC ....... G10L 15/22; G10L 15/26; G10L 15/063; G10L 15/07; G10L 15/1822; G10L 15/18;
(Continued)

(56) References Cited

U.S. PATENT DOCUMENTS

| | | |
|---|---|---|
| 7,280,965 B1 | 10/2007 | Begeja et al. |
| 7,412,383 B1 | 8/2008 | Alonso et al. |

(Continued)

FOREIGN PATENT DOCUMENTS

| | | |
|---|---|---|
| JP | 2007102104 A | 4/2007 |
| JP | 2009110503 A | 5/2009 |
| WO | 2013155619 A1 | 10/2013 |

OTHER PUBLICATIONS

Celikyilmaz, et al., "A Joint Model for Discovery of Aspects in Utterances", In Proceedings of the 50th Annual Meeting of the Association for Computational Linguistics, Jul. 8, 2012, 9 pages.
(Continued)

*Primary Examiner* — Dwayne D Bost
*Assistant Examiner* — Stephen M Brinich
(74) *Attorney, Agent, or Firm* — Merchant & Gould

(57) ABSTRACT

Domain-specific language understanding models that may be built, tested and improved quickly and efficiently are provided. Methods, systems and devices are provided that enable a developer to build user intent detection models, language entity extraction models, and language entity resolution models quickly and without specialized machine learning knowledge. These models may be built and implemented via single model systems that enable the models to be built in isolation or in an end-to-end pipeline system that
(Continued)

enables the models to be built and improved in a simultaneous manner.

20 Claims, 14 Drawing Sheets

(51) Int. Cl.
    *G10L 15/00* (2013.01)
    *G10L 15/07* (2013.01)
    *G10L 15/22* (2006.01)
(58) Field of Classification Search
    CPC ..... G10L 15/065; G10L 15/265; G10L 15/00;
             G10L 15/183; G10L 17/00; G10L 17/04;
             G10L 15/005
    USPC .............. 704/1–10, 270, 250, 255–257, 266,
                      704/E15.007, E15.008
    See application file for complete search history.

(56) References Cited

U.S. PATENT DOCUMENTS

| | | | |
|---|---|---|---|
| 7,516,072 B2* | 4/2009 | Campbell | B60R 16/0373 381/86 |
| 7,596,498 B2 | 9/2009 | Basu et al. | |
| 7,716,056 B2 | 5/2010 | Weng et al. | |
| 7,958,068 B2 | 6/2011 | Smith et al. | |
| 7,987,188 B2 | 7/2011 | Neylon et al. | |
| 8,086,549 B2 | 12/2011 | Qi et al. | |
| 8,239,189 B2 | 8/2012 | Skubacz et al. | |
| 8,321,220 B1 | 11/2012 | Chotimongkol et al. | |
| 8,356,030 B2 | 1/2013 | Neylon et al. | |
| 8,554,701 B1 | 10/2013 | Dillard et al. | |
| 8,589,172 B2 | 11/2013 | Alonso et al. | |
| 8,589,317 B2 | 11/2013 | Paquet et al. | |
| 8,595,153 B2 | 11/2013 | Drucker et al. | |
| 8,600,013 B2* | 12/2013 | Daye | H04M 3/4936 379/88.01 |
| 9,070,366 B1* | 6/2015 | Mathias | G06F 17/279 |
| 9,104,655 B2 | 8/2015 | Kyaw et al. | |
| 9,129,008 B1 | 9/2015 | Kuznetsov | |
| 9,158,761 B2 | 10/2015 | Taylor et al. | |
| 9,547,471 B2 | 1/2017 | Williams et al. | |
| 2004/0172238 A1 | 9/2004 | Choo et al. | |
| 2004/0204940 A1 | 10/2004 | Alshawi et al. | |
| 2007/0067159 A1 | 3/2007 | Basu et al. | |
| 2007/0136062 A1 | 6/2007 | Braunschweiler | |
| 2008/0201145 A1 | 8/2008 | Chen et al. | |
| 2008/0249764 A1 | 10/2008 | Huang et al. | |
| 2009/0094033 A1* | 4/2009 | Mozer | G10L 15/22 704/251 |
| 2009/0119102 A1 | 5/2009 | Bangalore et al. | |
| 2009/0125371 A1 | 5/2009 | Neylon et al. | |
| 2009/0157571 A1 | 6/2009 | Smith et al. | |
| 2011/0106807 A1 | 5/2011 | Srihari et al. | |
| 2011/0208522 A1 | 8/2011 | Pereg et al. | |
| 2011/0252036 A1 | 10/2011 | Neylon et al. | |
| 2012/0253792 A1 | 10/2012 | Bespalov et al. | |
| 2014/0257794 A1 | 9/2014 | Gandrabur et al. | |
| 2015/0019204 A1 | 1/2015 | Simard et al. | |
| 2015/0019211 A1 | 1/2015 | Simard et al. | |
| 2015/0019460 A1 | 1/2015 | Simard et al. | |
| 2015/0019461 A1 | 1/2015 | Simard et al. | |
| 2015/0019463 A1 | 1/2015 | Simard et al. | |
| 2015/0242761 A1 | 8/2015 | Amershi et al. | |
| 2016/0005395 A1 | 1/2016 | Williams et al. | |

OTHER PUBLICATIONS

Liu, et al., "ASGARD: A Portable Architecture for Multilingual Dialogue Systems", In Proceedings of IEEE International Conference on Acoustics, Speech and Signal Processing, May 26, 2013, 5 pages.

Spectre, Rob, "Using Natural Language Processing for Better SMS Interfaces Using Twilio and Python's TextBlob", Published on: Jun. 25, 2014 Available at: https://www.twilio.com/blog/2014/06/using-natural-language-processing-for-better-sms-interfaces-using-twilio-and-pythons-textblob.html.

Gasic, et al., "Incremental On-Line Adaptation of POMDP-Based Dialogue Managers to Extended Domains", In Proceedings of 15th Annual Conference of the International Speech Communication Association, Sep. 14, 2014, 5 pages.

"Speaktoit—Your Personal Assistant", Retrieved on: Dec. 4, 2014 Available at: https://assistant.ai/.

El-Kahky, et al., "Extending Domain Coverage of Language Understanding Systems via Intent Transfer between Domains Using Knowledge Graphs and Search Query Click Logs", In Proceedings of IEEE International Conference on Acoustic, Speech and Signal Processing, May 4, 2014, 5 pages.

"Interactive Machine Learning", Published on: Jun. 1, 2011 Available at; http://research.microsoft.com/en-us/um/redmond/groups/cue/IML/.

Craig, et al., "A Vertical Timeline Visualization for the Exploratory Analysis of Dialogue Data", In Proceedings of 16th International Conference on Information Visualisation, Jul. 11, 2012, 6 pages.

Bosch, et al., "ScatterBlogs2: Real-Time Monitoring of Microblog Messages Through User-Guided Filtering", In Proceedings of IEEE Transactions on Visualization and Computer Graphics, vol. 19, No. 12, Dec. 2013, 10 pages.

Kar, Saroj, "How Wit.ai Aims to Use Natural Language Processing to Transform IoT", Published on: Mar. 25, 2014 Available at: http://siliconangle.com/blog/2014/03/25/how-wit-ai-aims-to-use-natural-language-processing-to-transform-iot/.

U.S. Appl. No. 14/075,690, Bottou, et al., "Active Labeling for Computer-Human Interactive Learning", filed Nov. 8, 2013.

U.S. Appl. No. 14/075,708, Lakshmiratan, et al., "Active Featuring in Computer-Human Interactive Learning", filed Nov. 8, 2013.

U.S. Appl. No. 14/075,701, Simard, et al., "Feature Completion in Computer-Human Interactive Learning", filed Nov. 8, 2013.

U.S. Appl. No. 14/075,679, Simard, et al., "Interactive Concept Editing in Computer-Human Interactive Learning", filed Nov. 8, 2013.

Bespalov, "Sentiment Classification Based on Supervised Latent n-gram Analysis", In Proceedings of the 20th ACM International Conference on Information and Knowledge Management, Oct. 24, 2011, pp. 375-382.

Gorin, et al., "Automated Natural Spoken Dialog", In Proceedings of IEEE Computer Society, vol. 35, Issue 4, pnl 1, 2002, pp. 51-56.

Haffner, et al., "Optimizing SVMS for Complex Call Classification", In Proceedings of IEEE International Conference Un Acoustics, Speech, and Signal Processing, vol. 1, Apr. 6, 2003, 4 Pages.

PCT International Search Report and Written Opinion Issued in Application No. PCT/US2015/038923, dated Jan. 22, 2016, 21 Pages.

Tur, et al., "Active Learning for Spoken Language Understanding", In Proceedings of the International Conference on caustics, Speech, and Signal Processing, vol. 1, Apnl 6, 2003, pp. 1-276-1-279.

Ye et al. "Sentiment classification of online reviews to travel destinations by supervised machine learning approaches", Expert Systems with Applications 36, pp. 6527-6535, published in 2009. 9 pages.

Gupta, et al., "The AT&T Spoken Language Understanding System", In IEEE Transactions on Audio, Speech, and Language Processing, vol. 14, Issue 1, Jan. 1, 2006, pp. 213-222.

International Search Report and Written Opinion Issued in PCT Application No. PCT/US2015/067549, dated Mar. 31, 2016, 11 Pages.

Lasecki, et al., "Chorus: A Crowd-Powered Conversational Assistant", In Proceedings of the 26th annual ACM symposium on User interface software and technology, Oct. 8, 2013, 12 pages.

Patra, et al., "A Fast Cluster-Assumption Based Active-Learning Technique for Classification of Remote Sensing Images", In IEEE Transactions on Geoscience and Remote Sensing, vol. 49, Issue 5, May 2011, 10 pages.

(56) References Cited

OTHER PUBLICATIONS

Vaassen, et al., "Automatic Emotion Classification for Interpersonal Communication", In Proceedings of the 2nd Workshop on Computational Approaches to Subjectivity and Sentiment Analysis, Jun. 24, 2011, 7 pages.
"Office Action Issued in Japan Patent Application No. 2017-521040", dated May 7, 2019, 6 Pages.

* cited by examiner

Experiment 1: Intent models in isolation

| Intent | Effort 410 | Number of labels 415 |
|---|---|---|
| MoviesDirectedBy | 180 minutes* | 1121 420 |
| WhoDirected | 180 minutes* | 1173 430 |
| MovieRuntime | 90 minutes | 600 440 |

405

*Estimate

FIG. 4

Experiment 2: End-to-End Intent Modeling _700_

| Method _710_ | Total effort | Number of labels | Precision _720_ |
|---|---|---|---|
| IL | 60 minutes | 470 | 88% _730_ |

GENERATION OF LANGUAGE UNDERSTANDING SYSTEMS AND METHODS

CROSS-REFERENCE TO RELATED APPLICATIONS

This application claims the benefit of U.S. Provisional Patent Application No. 62/099,480, filed Jan. 3, 2015 and titled "Generation of Language Understanding Systems and Methods."

BACKGROUND

With the advent of modern computing systems, a variety of personal computing systems and devices have become enabled with conversational systems and applications that allow a user to speak a question to his/her computing device in search of information that will be provided by the computing device in response to the question. For example, in a typical setting, a user speaks a question to her handheld mobile telephone or tablet computing device such as "where is the closest pizza restaurant?," and the user has an expectation that her device (if equipped with an appropriate application) will respond to the question with a phrase like "I have found three pizza restaurants nearby." According to some systems, the application may provide the user with addresses and other information responsive to the user's request. In some cases, received questions are processed locally on the user's computing device, for example, where the user's calendar information is interrogated for questions that are calendar-oriented, where a local weather application is interrogated for weather-oriented information, where a local contacts database is interrogated for contacts-oriented information, and the like. If information responsive to the request cannot be obtained locally, some systems use the received request to conduct an Internet-based information search, and Internet-based search results responsive to the user's request are returned to the user.

One of the significant difficulties encountered in the development and implementation of such systems involves language understanding. That is, a problem in the development and implementation of such systems is the understanding of natural language spoken by users so that components of a given spoken utterance may be utilized for executing a computer-enabled function. This difficulty is particularly problematic for developers of new applications or functions that are offered to users to allow users to utilize those applications or functions by voice interaction.

For example, if a provider of taxi services wishes to offer a software application allowing users to speak a request into their handheld computing devices (e.g., mobile telephone) for requesting a taxi, the provider of the application is faced with the daunting task of implementing a language understanding model that will understand the many different ways in which a user may speak a request for taxi services into the application that will be understood by the application in order to provide the requested service. For example, such a computer-enabled taxi service might receive spoken requests such as "I need a taxi," "Can you get me a car?," "Is this a taxi service?," "I need a cab to downtown," and the like. The problem with such spoken phrases is that they may be spoken in structures, formats and with words and phrasing that are as different as the number of people using the service. That is, the service may receive a request in the form of a spoken utterance that differs from other similar spoken utterances in an almost limitless manner.

For example, in these provided example utterances, several different terms were used to describe the physical device in which the user would be carried, including taxi, car, cab, and the like. In addition, some of the phrases were posed as questions while some of the utterances were posed as statements. Some of the utterances could be understood as requesting a taxi service, while some of the utterances could be understood as a search directed toward purchasing a vehicle. In response to such language understanding difficulties, developers and implementers of language understanding systems typically engage in a very slow, painstaking and labor-intensive effort of teaching the components of a language understanding system the many different variations of terms and phrasing that might be expected by an application providing a service in response to a speech-based request. For example, a data engineer collects utterance data that contains instances of a target user intent. A user experience designer creates labeling instructions that explain the new target intent. A crowd-source engineer creates a crowd-sourcing task where workers apply the labeling instructions to data (various utterances) received by numerous example users in a crowd-sourcing task. A machine-learning expert uses this data to build intent detection models that may determine the intent of a user speaking a request into her computing device, as well as, entity extraction models that extract entities (e.g., terms in a spoken utterance that may be the subject of the utterance such as "taxi").

In addition, another problem includes issues with the definition of the intent or entities that often surface only at the end of the process when the model performance is measured thus requiring the whole process to be repeated. Overall, such a process can take weeks or even months to develop and impacts the ability of existing providers of language understanding models to extend language understanding to new types of spoken utterances. Such a process also impacts the ability of application or functionality providers to integrate the applications or functionalities into conversational systems because of the inability of such providers to develop complex language understanding models to allow spoken utterances to be understood by their applications and functionalities for causing execution of those applications and functionalities.

SUMMARY

Examples provide domain-specific language understanding models that may be built, tested and improved quickly and efficiently. According to examples, methods, systems and devices are provided that enable a developer to build user intent detection models, language entity extraction models, and language entity resolution models quickly and without specialized machine learning knowledge. These models may be built and implemented via single model systems that enable the models to be built in isolation or in an end-to-end pipeline system that enables the models to be built and improved in a simultaneous manner.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The details of one or more embodiments are set forth in the accompanying drawings and description below. Other features and advantages will be apparent from a reading of the following detailed description and a review of the

BRIEF DESCRIPTION OF THE DRAWINGS

FIG. 4 is a table illustrating data received through experimental intent modeling in isolation.

FIG. 7 is a table illustrating data received through the experimental operation of an end-to-end intent model according to examples.

FIG. 8 illustrates a computer-enabled user interface for allowing a user to interact with the system and device illustrated in FIG. 2 for training and/or improving output of the system or device.

DETAILED DESCRIPTION

Figure 1:
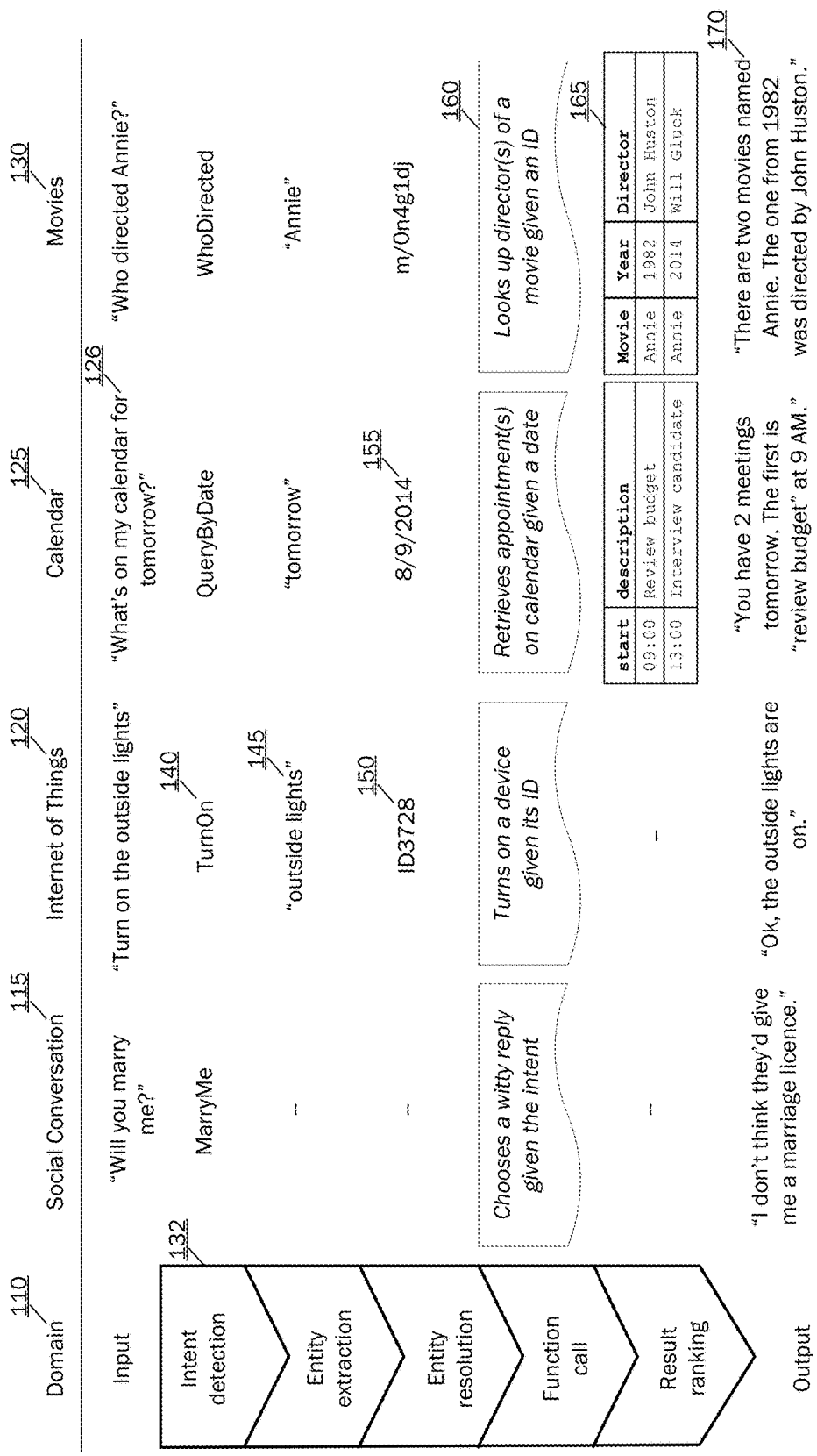
FIG. 1 illustrates a number of types of spoken utterances and how such spoken utterances may be understood by a conversational system for using components and understanding of such spoken utterances for requesting functions or services.

The following detailed description refers to the accompanying drawings. Wherever possible, the same reference numbers are used in the drawings and the following description to refer to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is described by the appended claims.

As briefly described above, examples are directed to generation and implementation of language understanding models for allowing software applications to receive input and/or queries extracted from or developed from spoken utterances. More particularly, examples address rapidly adding new functionality to a conversational system such that the conversational system may be scaled to new domains. Examples allow a single user to teach a conversational system to answer a new type of question or request such that a function or service may be executed or provided based on the new type of question or request. For example, if a conversational system receives a new type of question such as "Which movies did <DIRECTOR> direct?," or "Add a new appointment to my calendar for <date> about <subject>," according to examples, a language understanding model of a given conversational system may be taught to answer such questions and to utilize entities (e.g., terms or phrases) of such spoken questions for executing or providing a desired function or service.

As illustrated with examples described below, significant benefits and/or advantages are afforded to users and systems, as well as, to the technology area of language understanding. For users, the ability to speak natural language utterances for causing the execution of a desired function is enhanced because different types of utterances for executing a given function (e.g., "find taxi," "get me a taxi," "I need a car," and the like) may be more efficiently understood and labeled for causing execution of the desired function (e.g., a taxi ordering function). For computing systems, as described below (e.g., with reference to FIG. 7), a significant speed-up is achieved in the labeling of spoken utterances for execution of functions which reduces computer processing time, memory consumption and provides overall improvement to a language understanding computing system, described herein. In terms of the technology area of language understanding, because of the diversity in spoken languages, enhancing the ability to understand and label spoken utterances is a significant benefit owing to the growing need for voice-activated computing functionality.

FIG. 1 illustrates a number of types of spoken utterances and how such spoken utterances may be understood by a conversational system for using components and understanding of such spoken utterances for requesting functions or services. According to examples, a conversational system can be described as a processing pipeline as illustrated in FIG. 1. First, spoken input is recognized using an open-domain automatic speech recognizer and is converted to words such as "Am I free today at noon?". Such a speech recognition step may be skipped if the input is provided by text. As should be appreciated by those skilled in the art, an automatic speech recognizer (ASR) may operate according to a variety of well-known methods. For example, according to one acceptable automatic speech recognition method, a spoken utterance is broken into words by using a word breaking mechanism that breaks spoken utterances into words based on common word separations including spaces, punctuation, pauses, common word patterns, and the like. Once such a spoken utterance is broken into words, individual words (entities) or combinations of words or entities may be compared against libraries of words or entities to return text-based conversions of the spoken utterances. As should be appreciated, a given entity may include or span multiple words. For example, the words "Empire State Building" may be treated as a single entity.

For example, a spoken pattern of five numbers separated from other entities by a pause or other commonly known separation may be compared against other five number patterns for returning a zip code. For another example, a received set of numbers immediately preceding one or more words may be utilized for determining/recognizing a street address. As should be appreciated, automatic speech recognition systems are well known to those skilled in the art and need not be described in further detail herein.

Once a spoken utterance is converted to words by an automatic speech recognizer, the user's intent and entities of the user's utterance are determined for developing a function call that may be provided to a given application for requesting a desired function or service. Referring to FIG. 1, a number of different spoken utterances are provided according to a number of different types of spoken utterances. For example, a typical social conversation 115 may include a spoken question such as "Will you marry me?" A typical Internet-of-things utterance 120 may include a phrase such as "Turn on the outside lights." A typical calendar utterance 125 may include a question such as "What's on my calendar for tomorrow?" And, a typical general information request question may include a question 130 such as "Who directed Annie?"

According to examples, once such an utterance is received and is converted to words by an appropriate automatic speech recognizer, the words may be passed through a processing pipeline 132 wherein the user's intent is detected, entities (e.g., words or combination of words) of the utterance may be extracted and resolved, if necessary, and an appropriate function call may be generated for passing to an application for executing or obtaining a desired function or service. For example, referring still to FIG. 1, for the phrase "Turn on the outside lights" uttered by a user, the user's intent 140 may be determined as "turn on." Entities may be extracted from the utterance after it has been converted to words such as "outside lights" 145. Entity resolution may include resolving extracted entities into canonical forms such as specific IDs 150 (e.g., a specific ID for the "outside lights").

After the user's intent is detected, entities are extracted, and entity resolution is performed, if necessary, a function call may be generated and provided to an appropriate application for executing the desired function or for obtaining the desired result. For example, a function call may be in the form of an application programming interface (API) that is passed to an application or function for requesting execution for a given result. The user intent and the extracted entities may be passed as input to the function via the function call. For example, the user intent of "turn on" and the resolved extracted entity of "ID 3728" that identifies a given set of lights may be passed in the function call to the application to cause the application to turn on the identified lights.

For another example, if the utterance "Am I free today at noon?" is converted to words from an automatic speech recognizer, a user intent such as "read from calendar" may be determined. In parallel, entity extraction may identify utterance substrings that contain entities such as the date of "today" or time of "noon," and entity resolution may map those substrings to canonical forms such as 2014-12-31 (155) or 12:00:00 Z-08:00:00. Finally, a function is called that takes the intent and entities as input, optionally updates an internal dialog state or interacts with a database and produces a response as output 170. Referring still to FIG. 1, in response to the example calendar request 126, a function call receives a result showing items on the user's calendar for a specified date and an output spoken back to the user of "You have two meetings tomorrow. The first is 'Review Budget' at 9:00 a.m." After such a response is generated as output, the cycle may then repeat as necessary if the user speaks additional utterances to the application. As should be appreciated, processes such as intent detection and entity extraction/resolution may be done in isolation relative to each other, jointly, in parallel, or in sequence, as described herein.

According to an example, a result ranking module (described below with reference to FIG. 2) may be utilized for ranking results from the received request. In such a case, a higher ranking result may be provided as a response, or all results may be passed as a response in some type of appropriate order. In the example illustrated in FIG. 1, the director 165 for the oldest found movie is provided as a result, but similarly, the director of the newest movie or the director of both movies could be provided as a result in order from oldest to newest, or the like. For another example, if a question posed to a taxi location service finds two results, a result indicating a taxi service that is closest to the user's present location may be returned as a first result, followed by the next closest service, and so on.

In order to add new functionality to a conversational system that will respond to spoken utterances, improved development and implementation of intent detection models, entity extraction models and entity resolution models is provided. As briefly described above, if a new functionality is offered by an application provider, for example, a functionality for allowing a user to order taxi service by spoken utterance into the user's handheld computing device (e.g., mobile telephone), then the development of an appropriate language understanding model is required to allow the provider of the new service to get the offered service online as quickly as possible. For example, for a new functionality to be added to a conversational system, one or more new intent detection models may be required to allow the conversational system to determine user intent from spoken utterances directed to the newly offered functionality. In addition, one or more new entity extraction models and entity resolution models may be required because, while certain entity types like times, dates, and locations may be general, many are domain specific, for example, entities directed to a specific room, location in a building or other facility, or "Internet of things" domains, types of foods in a diet logging domain, types of exercises in a fitness domain, etc. That is, for any domain having associated user intents and entities, new intent detection models and new entity detection and resolution models may be required.

For example, a new fitness monitoring functionality may be provided, and various types of exercises may be spoken to the fitness monitoring functionality that are new exercises that will not be understood by existing intent detection and entity extraction models. Thus, according to examples, quickly building new intent and entity extraction/resolution models are advantageous steps in adding a new functionality to a conversational system so that words converted from spoken utterances may be mapped to functional calls (e.g., APIs) that may be passed to a new functionality so that the new functionality will understand received words and user intent so that the functions of the new functionality may be executed as desired.

As will be described in further detail below, examples involve generating new user intent models and entity extraction/resolution models through a process of interactive learning. Through interactive learning, a very large data set may be loaded into the development tool described below for beginning the process of isolating and labeling words that may be used for developing intent models for determining user intent from received words and for isolating entities that may be used for developing entity extraction/resolution models for isolating entities from spoken utterances that will be acted upon by a receiving functionality. For example, as described above, a phrase such as "turn on the outside lights" must be processed such that a user intent of "turn on" is isolated and such that an entity such as "outside lights" is isolated for allowing a functionality responsible for turning on lighting systems to understand a command of turning on a set of lights and for understanding that the target lights are the "outside lights."

In building such an interactive learning system for developing intent and entity extraction/resolution models, large amounts of data are input into the end-to-end processing pipeline for analysis. According to one example, such input may be received by capturing large numbers of voice input from various users, or from capturing type-written input captured from users and developers alike. For example, a starting phrase of "find taxi" may be utilized as a starting interactive learning phrase which would then implicate spoken utterances containing words of "find" and "taxi." Once such words are identified and isolated, the utterance containing the words (e.g., "find taxi") may be labeled as being either a positive or negative instance of a particular class, for example, a positive or negative instance of an intent. For example, such phrases as "Find me a taxi," "I want to find a taxi," or "How do I find a taxi?" may be received as part of the data input to the system. Such phrases may be determined as positive instances of the class, but other phrases such as "Yesterday, I wasn't able to find a taxi" (e.g., a phrase captured from a text message from one user to a second user) may be determined as a negative instance of the class because that instance is not seeking a taxi but is describing a past difficulty in finding a taxi. Thus, triggering a function call on the negative instance would not be appropriate.

Continuing on from the present example, once the system has 10, 20, 30, or more of such labels, then an associated intent classification model or entity extraction (classification)/resolution model may be generated, but such models may be very weak at this point. However, such models can now be run on large amounts of data for beginning a process of interactive learning for quickly improving the models to an operational status. As should be appreciated, in such an interactive learning process some words or phrases extracted from a spoken utterance may readily be determined as positive instances of the class (e.g., a class associated with finding a taxi), some words or phrases may readily be determined as negative instances, but a large number of words or phrases may score somewhere in the middle between affirmatively positive and affirmatively negative. According to examples, and as described in further detail below, the analysis of large sets of data for generating intent models and entity extraction/resolution models is speeded up dramatically such that isolating positive instances from the data set for improving the building of the models is achieved.

A second aspect of interactive learning is that as received utterances are analyzed and classified, the features being used for developing the intent and entity models may be edited for improving performance of the being-generated models. For the domain example described above of obtaining taxi services, important features may include the word "find," the word "me," the word "taxi," the phrase "find me," the phrase "find a taxi," and the like. Other features may include the length of the utterance or other indicators, for example, the location of the user, the time of day, information from the user's calendar that may provide helpful information as to the location of the user now and in the future, and the like. Such features and indicators may be utilized for further assisting in the labeling of positive words or phrases that may be in building intent models and entity extraction/resolution models, as described herein.

As should be appreciated, isolating and labeling words or phrases for use in developing an intent model are analogous to isolation of words and phrases that may be used in developing an entity extraction/resolution model. For example, for developing an entity extraction model for the example described above, such words as taxi, cab, car, SUV, vehicle, transporter, and the like may be isolated and labeled as positive entities for use in an entity extraction model for use in a language understanding model for the functionality of providing taxi services.

In terms of entity resolution, once entity extraction model words and phrases are isolated and positively labeled, a mapping process may be utilized for development of the entity resolution model. For example, a mapping of words such as "cab," "taxi," "car" may be mapped to a canonical ID for a certain type of sedan that may be used for taxi services, while words such as "limousine" or "limo" may be mapped to a different canonical identification for a different type of vehicle.

Figure 2:
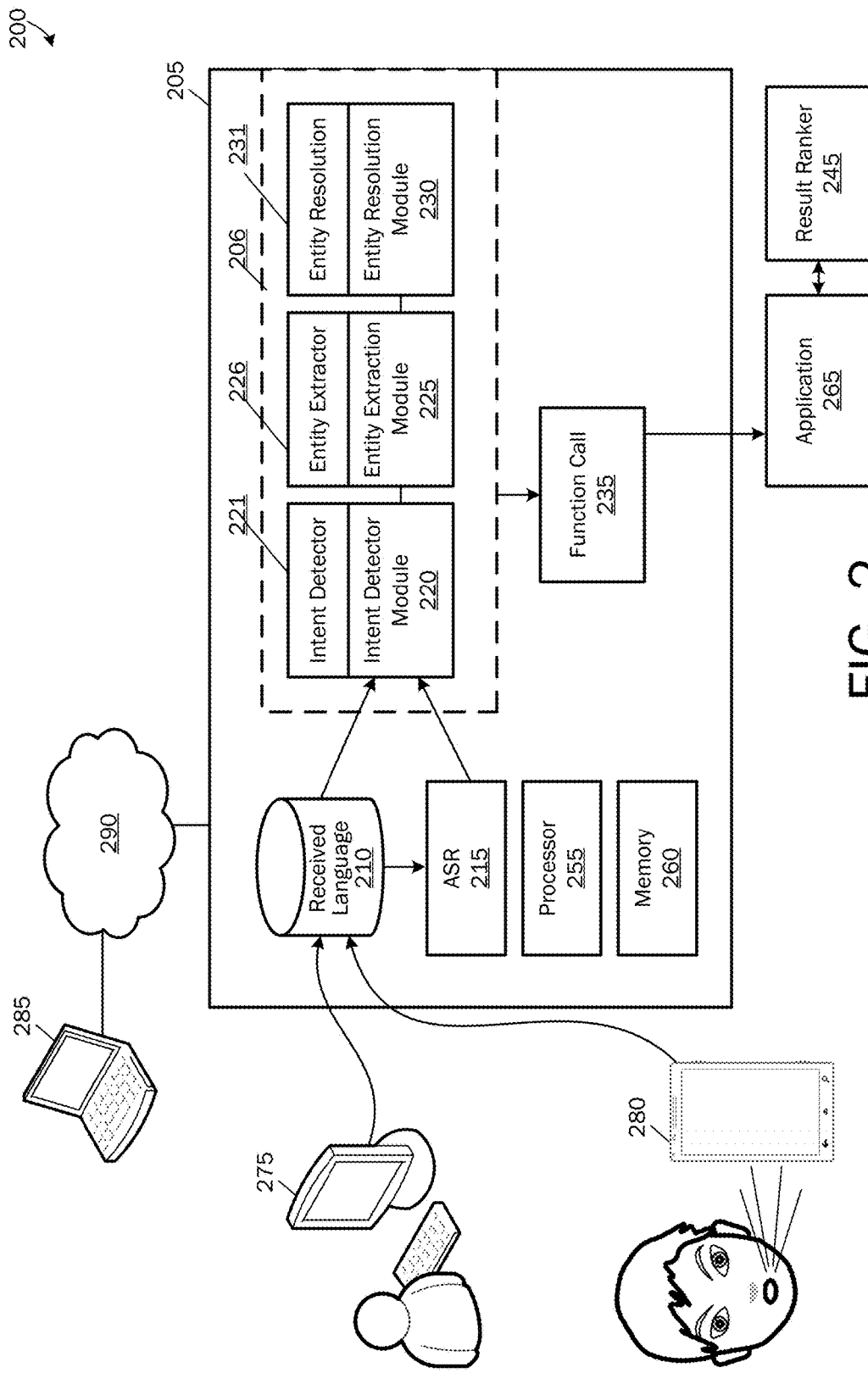
FIG. 2 is a simplified block diagram of a system or device for building and enabling a domain-specific language understanding model according to examples.

FIG. 2 is a simplified block diagram of a system or device 200 for building and enabling a domain-specific language understanding model according to examples. According to examples, the language understanding device or system 205 for improved language understanding is comprised of a plurality of components operative to receive typed or spoken language input and to develop intent detection models, entity extraction models and entity resolution models for use in concert with other components for developing a function call from a received spoken utterance that may be passed to an application for executing a desired function, as described herein.

Referring to FIG. 2, the system 205 includes a database 210 of received language that may be used for developing intent detection models, entity extraction models and entity resolution models, and in developing a function call after successful generation of intent and entity extraction/resolution models for obtaining the execution of a desired function. According to an embodiment, the received language database 210 may be populated with text-based queries from a computing device 275 either functionally associated with the system 205 or operated remotely from the system 205 through a distributed computing network. In addition, as described herein, one or more spoken utterances may be stored at the received language database 210 as received by speech input through one or more users via a speech input device 280 such as a handheld computing device like a mobile telephone, tablet computing device, a wearable device, or microphone associated with a desktop or laptop computing device or any other suitable computing device.

The automated speech recognition module 215 is operative to receive spoken utterances from the database 210 and for converting the spoken utterances to text-based words that may be used in both generation of intent and entity extraction/resolution models and for use in developing a function call that may be subsequently passed to a desired application. As should be appreciated, when language received to database 210 is text-based language received via a type-written language source, as described above, such language may skip the automated speech recognition module 215 and be passed directly to the pipeline 206.

The pipeline processing system 206 includes an intent detection development module 220, an entity extraction development module 225 and an entity resolution development module 230. As described below, language passed to the pipeline processing system 206 may be used by the intent detection development model module 220, the entity extraction development module 225 and the entity resolution development module 230 for generating and then for improving the performance of resulting intent detection models 221, entity extraction models 226 and entity resolution models 231 either in isolation, or in an integrated end-to-end iterative process until it is determined that the models have been sufficiently trained to be used in building function calls from subsequently received language input. The interactive learning process for generating and teaching such models are described in further detail below.

The function call module 235 is a module operative for receiving user intent determined from a received spoken utterance via the intent detection model 221 and for receiving extracted and resolved, if necessary, entities from the entity extraction and entity resolution models 226, 231. The function call module 235 is then further operative to develop a function call from the received user intent and extracted and/or resolved entities for ultimately passing to an application 265 for executing a desired function, as described herein. The application 265 is any application to which a spoken utterance is directed for execution of a desired function. As described herein, the application 265 uses the intent and entities received via the function call as execution instructions.

As described above with reference to FIG. 1, after a given function call 160 is passed to an application, oftentimes multiple results may be returned as a result of executing the function call. For example, referring to the results 165, two results were returned from the same function call. For example, from the question, "Who directed Annie?," directors for two different versions of the movie "Annie" are returned. A result ranker module 245 is operative to rank varying results from the function call, as described above with reference to FIG. 1.

Referring still to FIG. 2, the system 205 may operate as a standalone computing system or device for use in generating intent and entity extraction and resolution models. Thus, the system/device may receive input to the received language database, and the system/device 205 may pass output in the form of a function call to a receiving application. When the system/device 205 operates as a standalone computing system or device, a processor 255 and memory 260 will be utilized to provide the system/device 205 computing capabilities required for performing the functions described herein. A detailed discussion of such computing components is provided with respect to FIGS. 11-13 below.

Alternatively, the system/device 205 may operate as a cloud-based or remotely based language understanding system that is accessed from a remote computing device or system 285 via the Internet or other distributed computing network 290. According to either aspect, user interaction with the device or system 205 may be performed through one or more user interfaces either as web-based user interfaces or local user interfaces provided on a local computing device via the system or device 205, as illustrated and described below.

According to examples, once models 221, 226, 231 are developed, they may work in isolation relative to each other or they may be chained together (as illustrated in FIG. 2) (i.e., as they work in production) for additional interactive learning and improvement. For example an utterance may be input such as "I need a ride to the airport," and then the developer can process the utterance with the models to see what each step in the pipeline will accomplish. That is, the developer may examine which user intents will be determined, which entity or entities will be extracted, and which extracted entities will be resolved to canonical references, if necessary. If anywhere in that processing pipeline the system makes an incorrect decision, then the developer can correct the error, and then all of the subsequent stages of the pipeline are re-run based on the corrected current decision as an improved input. Thus, an utterance can be input and the processing pipeline 206 may be run, and the developer can see the answer that the system produces at the end before the answer is labeled for production use.

If the developer decides that the answer is correct for the received utterance, then she can accept the answer as a correct and it will be labeled for the intent model 221, entity extraction model 226 and/or the entity resolution model 231. On the other hand, if the answer is not correct, then the developer may make a change at whatever point in the pipeline she sees fit, and then the process can be re-run thereafter so that the process and the being-developed models 221, 226, 231 can be interactively improved.

A great benefit of this process and system is that when this pipeline is running, there can be many models (10s, 100s and more) being developed and trained because for a given utterance or set of utterances, many different intent detection and entity extraction models 221, 226, and each may have its own entity resolution model 231. The great benefit to the developer is that when she is running and examining the whole pipeline 206 and saving labels for correct answers, she is developing and training the models at an accelerated pace. Thus, the device/system 205 is a greatly improved and greatly more efficient system than prior systems because the processing and memory needs, as well as, developer time consumption are greatly reduced. For example, the developer may have a starting taxonomy of 20 different intents such as "Reserve a taxi," "Reserve taxi from current location," "Reserve black car," and the like. There may be 20 different intents for such different taxonomies and in order for the developer to know if she has chosen the right intent, she only needs to see the answer via a system user interface, as described below, to know whether correction to the system is needed.

As described above, examples comprise methods and tools (systems and devices) that enable a developer to build all three of the models 221, 226, 231, quickly, and without specialized machine learning knowledge. More particularly, there are single model methods/tools that enable a developer to build each of the three models described above in isolation, and there is a pipeline method/tool that enables a developer to see and improve all of the models in a pipeline simultaneously. That is, examples include methods/tools for "teaching" a conversational system how to answer a new type of question. The following is a discussion of the development of these three models. For purposes of discussion, consider the following are three example question types:

EXAMPLE 1

User input: What's on my calendar tomorrow?
System parse: Intent=ReadCalendar,
Entity.RelativeDateText="tomorrow",
Entity.RelativeDate=+1
Function call: Calendar.ReadCalendar(RelativeDate=+1)
Computer response: You have one appointment tomorrow, at 11 AM, with Frank, titled "Review status report"

EXAMPLE 2

User input: Who directed The Matrix?
System parse: Intent=WhoDirected,
Entity.MovieName="The Matrix", Entity.MovieID=Movie249182

Function call: Movies.WhoDirected (MovieID=Movie249182)

Computer response: Andy Wachowski and Lana Wachowski directed The Matrix.

EXAMPLE 3

User input: I'm starting my next rep—160 pounds bench press

System parse: Intent=StartExercise, Entity.ExerciseType="bench press",

Entity.Weight="160 pounds"

Function call: FitnessTracker.StartExercise (ExerciseType="bench press",

Weight="160 pounds")

Computer response: Roger that—benching 160 pounds, starting now.

As described above, a difficulty exists in efficiently developing models for converting such user input into words that may be labeled as user intents and entities that may be understood by a receiving application. This is difficult because of the variability and ambiguity of natural human language. For example, a question like "Who directed <MOVIE>?" might be expressed as "Who was the director of <MOVIE>?" or "<MOVIE> director please." Writing rules, such as "look for the word director" is not sufficient. For example, this example rule would be falsely triggered by "What movies are by the director <DIRECTOR>?" because a resulting function call likely would return movie titles instead of director names. Therefore the models 221, 226, 231 described herein are developed based on statistical models trained on data, and these models recognize the intent and entities derived from utterances and can cope with the variability of natural language.

According to an aspect, a developer desiring to develop models to process a new type of question starts the process with an idea for a new type of question they would like their conversational system to answer, such as questions like "Who directed <MOVIE>?".

As described above, to answer a new question, the developer needs to create the following three types of models:

1) An intent detector model 221 for the question type. For example, when building a "WhoDirected" intent, the detector should fire on a question like "Who was the director of 2001?" but not fire on a question like "What movies are by the director Stanley Kubrick?".

2) Entity extractor models 226 (zero or more). An entity extractor model identifies a region of a string that contains a certain type of entity. For example, an entity extractor for movies would select the string "2001" in the string "Who was the director of 2001?". An entity extractor for a person's name would not extract any strings from this input.

3) Entity resolution model 231 (zero or more). Some types of entities exist only as strings, such as subjects of meetings or the content of a text message. However, many entities need to be resolved to a canonical form, for example, an integer for a day of the month; an ID in a database for a movie; or a three-letter code for an airport. For these types of entities, an entity resolution model 231 maps from an extracted entity string like MovieText="2001" to an ID like MovieID=726351, or DayOfMonthText="third" to DayOfMonthInt=3. This is done with an entity resolution model.

All of these models are trained on data. Prior to the deployment of new functionality, this data may come from two sources. First, in large-scale conversational systems, there can be millions of utterances from real users that are available. Since users do not know the limits of the system, some will express intents which are not yet implemented. Such utterances can be used for training models. The second source of data is examples provided by the developer of the new functionality. For example a developer of a functionality for providing taxi services may provide the system with utterances like "Can you get me a taxi?". These examples will be valid (since the developer understands their domain), but may be incomplete since it is difficult to think of how other people may express an intent when the system is operational. After new functionality is deployed, real examples of usage will be observed and can be used as training data to improve the models.

As briefly described above, according to examples, development of the models 221, 226 and 231 may be performed using single model methods/tools that enable a developer to build each of the three models described above in isolation, and using a pipeline method/tool that enables a developer to see and improve all of the models in a pipeline simultaneously. The following is a discussion of these two methods of building the three models.

The single-model tools are used to evaluate or improve an individual model for intent detection, entity extraction, or entity resolution. These are all statistical models that examine features of the utterance, such as which words or phrases are present, the length of the utterance, or other characteristics such as the location of the user. These models are trained on positive and negative labeled examples of the intent. According to examples, in a corpus of potentially millions of utterances, a very small fraction will be positive. For example, 0.1% of utterances might be in the category "Who directed <MOVIE>".

To address this challenge, an interactive learning method may be employed. According to aspects, interactive learning is an iterative process. To start, a few "seed" example positive and negative examples are entered manually. These seed queries come from the developer, and can be expanded using automatic paraphrasing and/or translation methods. The seed labels are used to build a model, and then the model is used to choose which unlabeled examples from the large corpus to label. The new labels are used to re-train the model, and the process repeats. Rather than selecting new utterances to label at random, the model can identify which utterances it is most confused about. This dramatically reduces the number of utterances to label, thereby reducing the time required to build a model. Thus, the efficiency of the system/device 205 is greatly improved and processing time and memory consumption is greatly reduced.

In addition to selecting instances to label, the in-progress model can also automatically propose labels for new instances. This yields further time savings, because many of the predictions will be correct, so the developer only needs to correct model errors. Another benefit of the in-progress model proposing labels is that it gives the developer an indication of the performance of the current model.

Figure 3:
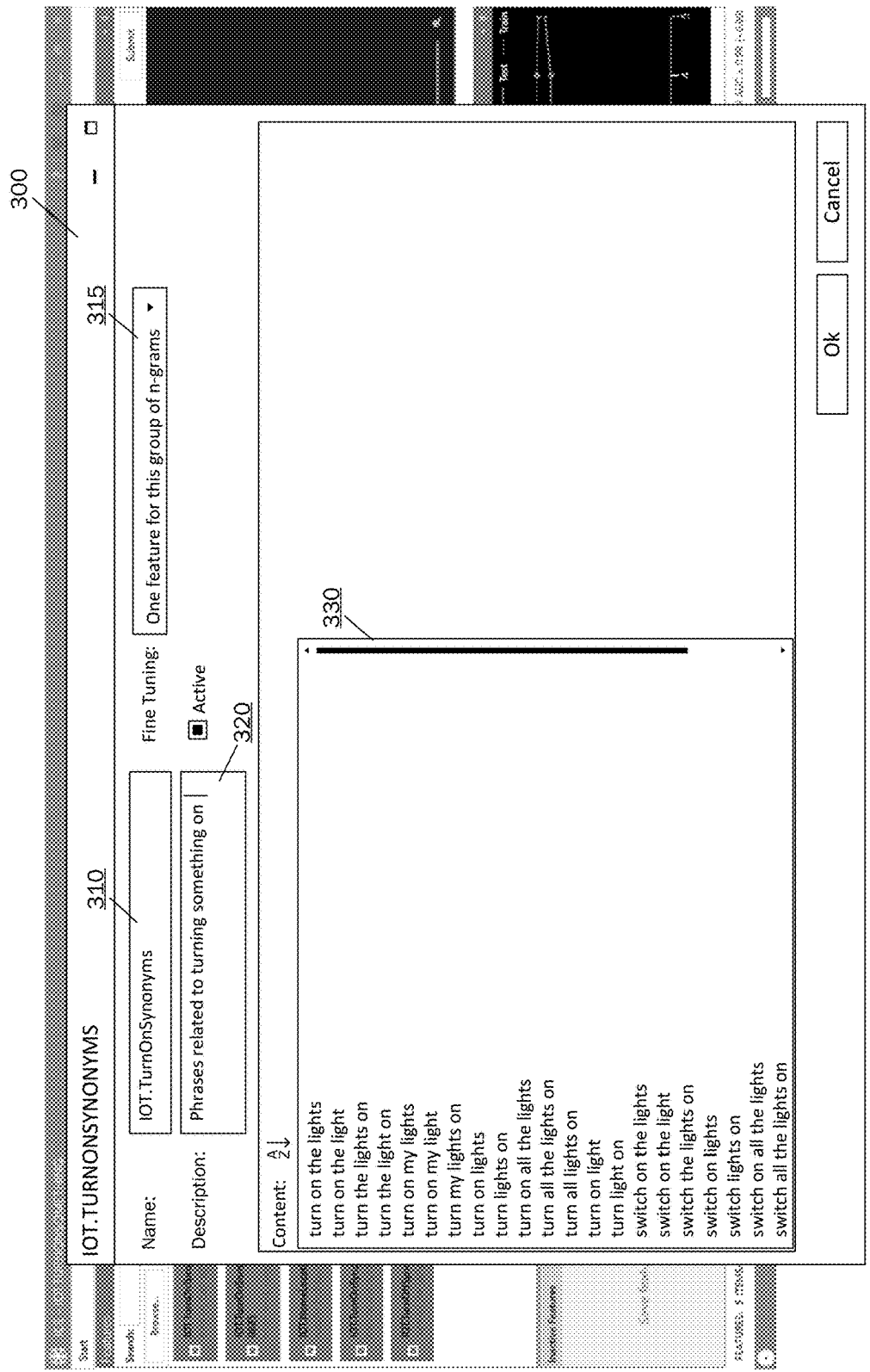
FIG. 3 illustrates a user interface through which an interactive classification and extraction model may be interfaced for detecting user intent, for extracting spoken utterance entities and for resolving spoken utterance entities in a conversational system.

Referring now to FIG. 3, according to an example, an interactive classification and extraction (ICE) system is used to assist in the automated development of intent detection models 221, entity extraction models 226, and entity resolution models 231. In FIG. 3, a user interface 300 is illustrated with which the developer may interact with the ICE system. A name field 310 allows for entry of the model. The example shown in FIG. 3 is related to development of a user intent model 221 for the intent of "turn on" as illustrated in FIG. 1. A description field 320 allows for entry of a description of the types of phrases contained in various utterances will be of interest, and a fine tuning field 215 allows the developer to adjust the scope of the review. In the content field 330, phrases and words found in various utterances that are responsive to the description are provided.

Referring now to FIG. 4, as a test of applying interactive learning to building language understanding models in conversational systems, consider the following test example. For purposes of testing, 25 million raw utterances received from user input into a conversational system were analyzed. For typed utterances, the log contained the text entered and for spoken utterances, the log contained the output of the (and possibly erroneous) automatic speech recognizer 215. Utterances likely to contain personal or identifying information were excluded.

The ICE system was then employed to build three intent detectors 221, 405 in the movies domain as follows:

1) Moviesdirectedby: The user is requesting to find all movies directed by a named person, for example "What movies did Stanley Kubrick direct?"

2) Whodirected: The user is requesting the name of a director for a named movie, for example "Who directed The Matrix?"

3) Movieruntime: The user is requesting the duration of a named movie, for example "How long is Gone with the Wind?"

During the test, the developer added a number of general n-gram features, specific n-grams like "director", "movie", and "who directed", and also a class containing all movie names found in a popular movie title database. The effort 410 expended (in minutes) and the number of resulting intent labels 415 are illustrated in FIG. 4. For example, for the Movieruntime intent model, labeling 600 utterances required 90 minutes.

Figure 5:
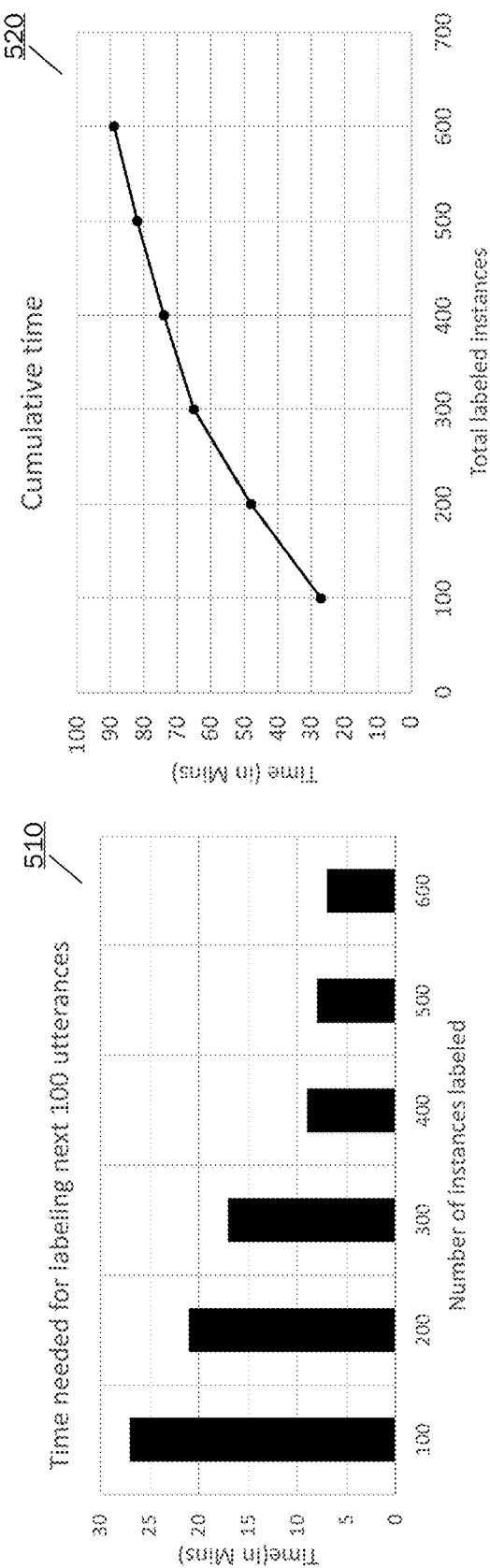
FIG. 5 graphically illustrates time needed to build an example intent model according to examples.

Referring to FIG. 5, a graph 510 shows that the marginal time per utterance declined sharply where the first 100 utterances required 28 minutes and where the last 100 utterances required 9 minutes. This illustrates the benefits of interactive learning. That is, for early in the process of labeling items, the developer is manually searching for utterances to label, and the model is unable to suggest labels, which causes a requirement for more feature engineering. On the other hand, for later in the process of labeling items, the model can be used to select utterances to label and can propose accurate labels. Thus, the features are stable so that little feature engineering is required. The graph 520 shows the cumulative time associated with labeling numbers of utterances across successively larger numbers of utterances.

Continuing with a discussion of this test example, the performance of all three intent detectors was next performed on held-out data. In order to evaluate precision of the models, the models were run on randomly ordered unseen utterances. The first 150 utterances that scored above a threshold were manually labeled. The precision ranged from 81% to 93% for the three intent models developed. The held-out test set excluded utterances which appeared in the training set, whereas in actual deployment, utterances in the training set may re-appear. Therefore, these are conservative estimates which could underestimate performance.

The false-positives for the Movieruntime intent model were examined by hand. The main cause of errors was that the n-gram "how long is" refers to many types of queries, and many words in English are titles of movies, making some instances difficult to classify. For example, in the utterance "How long is Burger King open," the words "Burger" and "King" are both found in titles of movies, but "Burger King" is not related to movies in this context. Dealing with such false-positive results is a consideration in use of the second method/tool where correction may be made on-the-fly in an end-to-end operation, described below.

According to examples, after preliminary individual models have been created, the developer can use an end-to-end pipeline tool to teach and improve performance of the models as described below. Labeling and correcting end-to-end interactions allows developers to view and debug interactions as they will be experienced by users. That is, developers can decide on intermediate labels for stages in the pipeline based on the response to the user. The pipeline 206 allows a visualization of the end-to-end processing done for an utterance. If the developer sees any errors in the pipeline, the developer can correct the output of any processing stage, and the remainder of the pipeline is immediately re-run using those corrections as the revised input. Once the whole pipeline has been checked and the correct answer is output at the end of the pipeline, the developer can save the labels, which stores labels for every component of the pipeline.

As with the tools for individual models, utterances can come from two sources. First, the developer can manually type in an utterance. This is useful when utterances of interest do not (yet) appear in the logs 210. Second, utterances can be sampled from the logs, for example all utterances from a given conversational system of interest. This shows how the pipeline will respond to real utterances. This sampling can be random or can be based on interactive learning described above with reference to FIG. 3. For example, by sampling utterances for which the pipeline produces high-confidence responses, the developer can check for false-positives. Or, by sampling utterances for which the pipeline is highly uncertain, the developer can provide labels to reduce model uncertainty.

Figure 6:
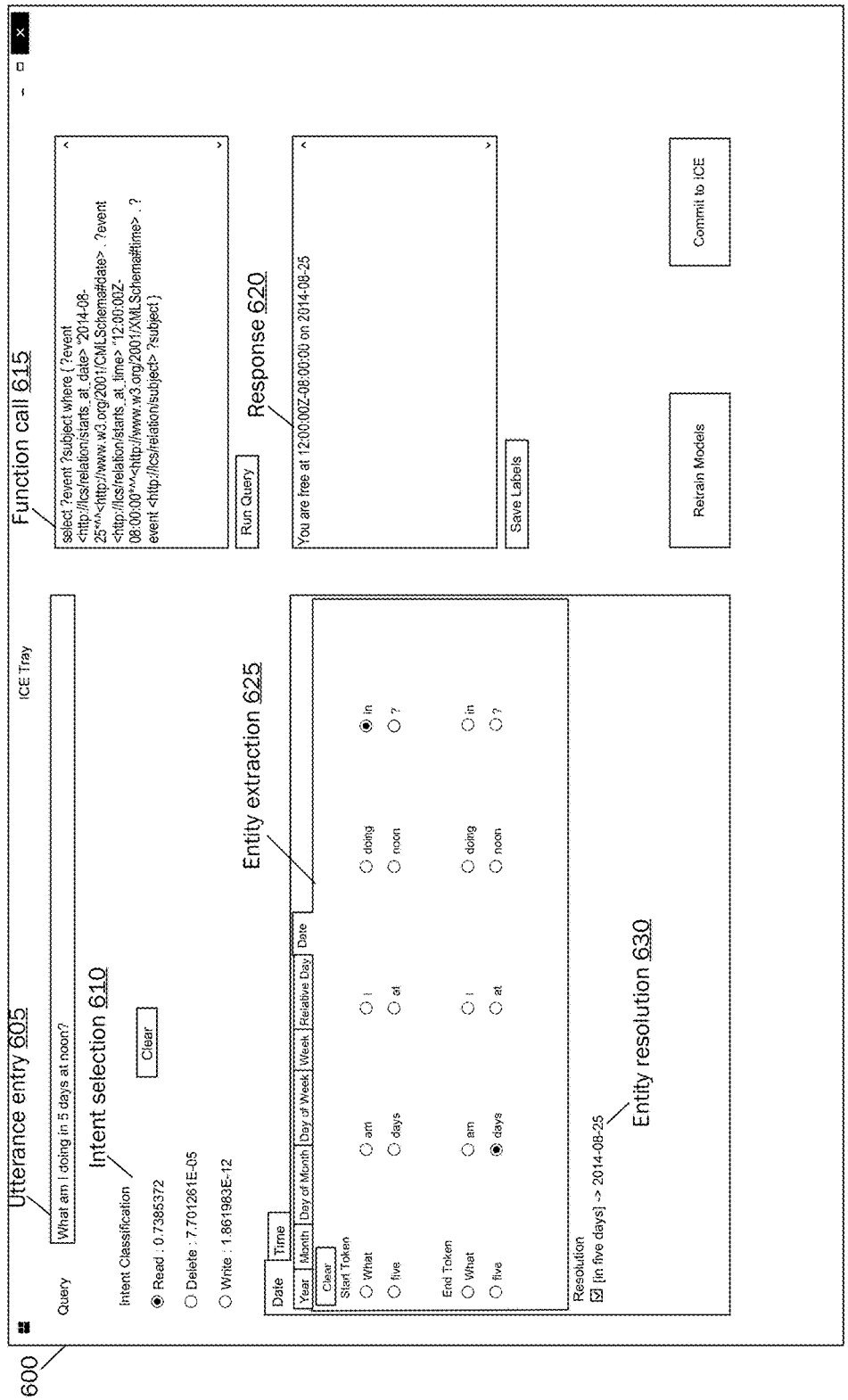
FIG. 6 illustrates a computer-enabled user interface for interacting with the language understanding modeling system or device illustrated in FIG. 2.

A user interface 600 for interacting with the end-to-end pipeline system 206 is illustrated in FIG. 6. In the upper left, the developer types in an utterance into the query field 605. The utterance is then scored (see scores in field 610) by all of the available intent detectors (three according to the current movies domain example), and an intent model is selected in field 610. The system 206 then performs entity identification using corresponding entity models 226 and results are displayed in field 625. As can be seen in field 625, the entities extracted from and associated with the entered query. Referring to field 630, the entity resolution model provides a canonical conversion of "in five days" to a canonical representation of 2014-08-25. A function call is then generated and displayed in field 615. If the function call is run, a response a response is generated and a response is displayed in field 620. If the label generated produces a correct response, then the developer may save the label 640, or if the label does not produce a correct response, the developer may make corrections to the intents or entities (e.g., select different of the intents and entities provided by the system) and cause the system 206 to re-run with the corrected input to retrain the models 645. If the developer is satisfied with a given labeling and response for a given utterance, the labeling may be committed to the ICE system 650.

A key benefit of the end-to-end system 206 is that it yields massive speed-up in labeling rate. This is, each utterance the developer checks/labels results in labels for all of the component models wherein a "positive" label is automatically selected for all the selected intents and entities, and "negative" labels are automatically selected for all the non-selected intents and entities. Thus, labeling a single utterance can produce 10s or even 100s of labels, and labeling a single utterance can often be done very quickly because the developer is shown the answer at the end of the pipeline, allowing a decision to be made about whether the whole pipeline is in the correct configuration without examining the contents of the whole pipeline. For example, suppose the utterance "Who directed Star Wars?" is sampled from the logs 210. The model answers this as "George Lucas" which the developer immediately knows to be true, so the developer clicks "Correct" and continues to the next utterance. In this case, the time required to label this utterance was 3 seconds. Now, consider that the pipeline 206 that produced this answer contains 30 models (10 intent detection models 221, 10 entity extraction models 226 and 10 entity resolution models 231). The developer's action produced labels for all of the models. Thus, the developer provided 30 labels in 3 seconds, for a rate of 1 label per 0.1 seconds. This pace would be impossible if the models were labeled individually without the use of the end-to-end pipeline processing system 206. A further benefit of the end-to-end pipeline is that the developer is exposed to the actual user experience rather than intermediate processing. This helps uncover system deficiencies which are not detectable when working with the models in isolation.

Consider the following test example. In this test, an analysis was performed to determine whether it was possible to improve a single intent model using the end-to-end system/tool 206. A working calendar dialog system with the following 2 intents was used: Readfromcal and Writetocal. A new binary intent detector, Deletefromcal, was developed using in the ICE tool, described above with reference to FIG. 3 (not in the end-to-end tool). As illustrated in FIG. 7, the developer labeled 470 instances in 60 minutes. On a held-out test set of 3 million unlabeled utterances using a decision threshold of 0.5, the model retrieved 114 utterances of which 88% were correct which was a precision of 88%. Next, the developer used the end-to-end system/tool 206 with three intent detection models, Readfromcal, Writetocal and Deletefromcal and two entity extraction models. The developer examined 33 utterances in 30 minutes, and the labels collected were used to update all of the intent and entity models, including the Deletefromcal intent model. The updated model for Deletefromcal was run on the same held-out data used with the baseline model as above, and the threshold was adjusted so that it achieved the same precision as the baseline model developed in isolation (88%). At this precision, the new model retrieved 134 sentences which was an increase of 18% compared to the baseline model which was statistically significant at p=0.004 using McNemar's test. This test analysis shows that the recall of the model increased for a fixed precision, which in turns means that the F-measure increased.

Figure 8:
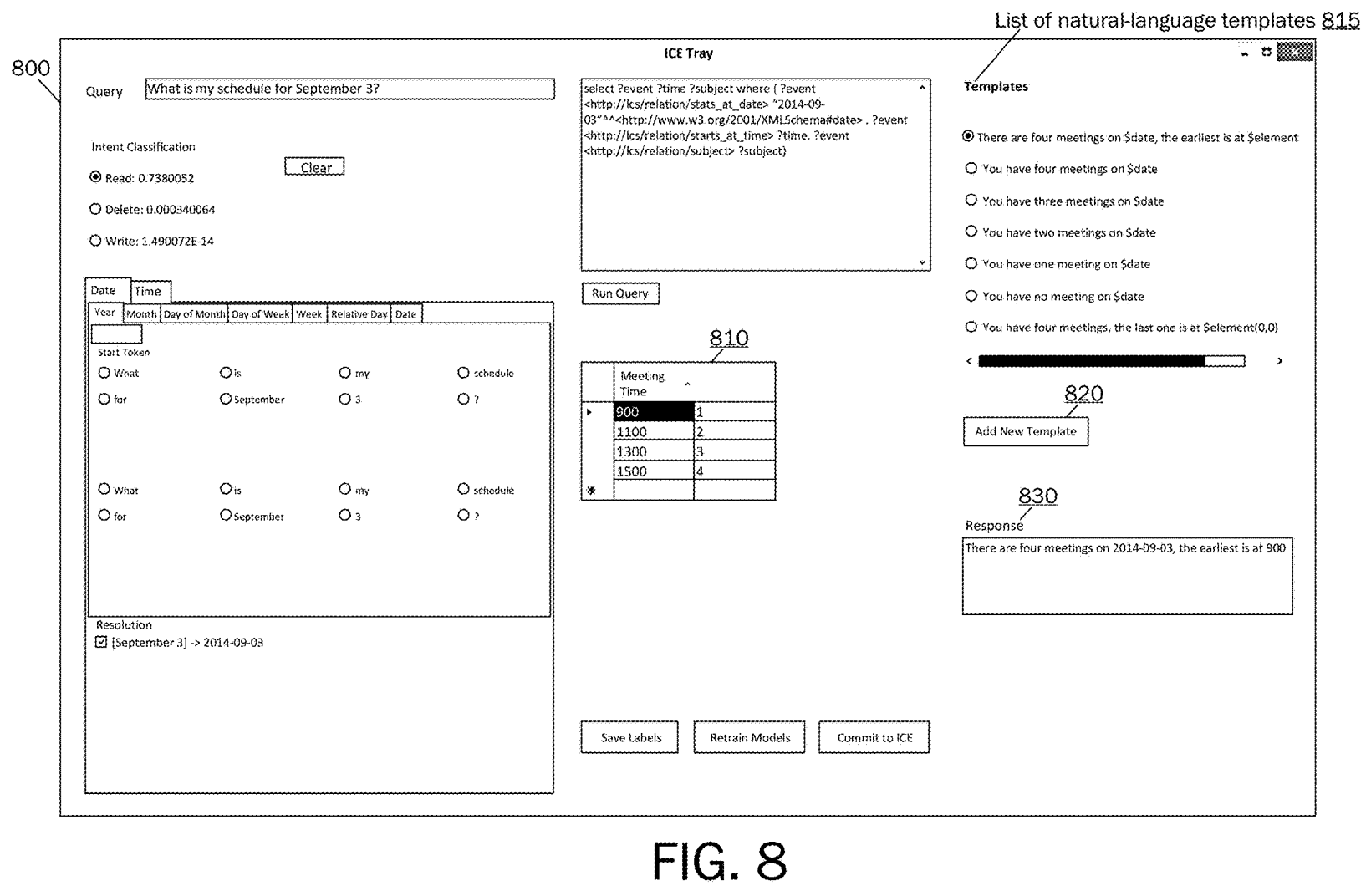

FIG. 8 illustrates a computer-enabled user interface for allowing a user to interact with the system and device illustrated in FIG. 2 for training and/or improving output of the system or device. Referring to FIG. 8, additional output useful to the developer is illustrated. In the user interface 800, in field 810 a sortable list of raw results (rows) from a used data source is provided. In field 815, a list of natural language templates are illustrated that may be selected for use in responses that will generated in response to function calls. Using function 820, new templates may be added on-the-fly by the developer. In field 830, a natural language response populated with the appropriate terms resulting from the function call and application execution are illustrated. Thus, with this user interface, the developer may train the output of the system by selecting and saving certain response templates for selected intent and entity models.

Figure 9:
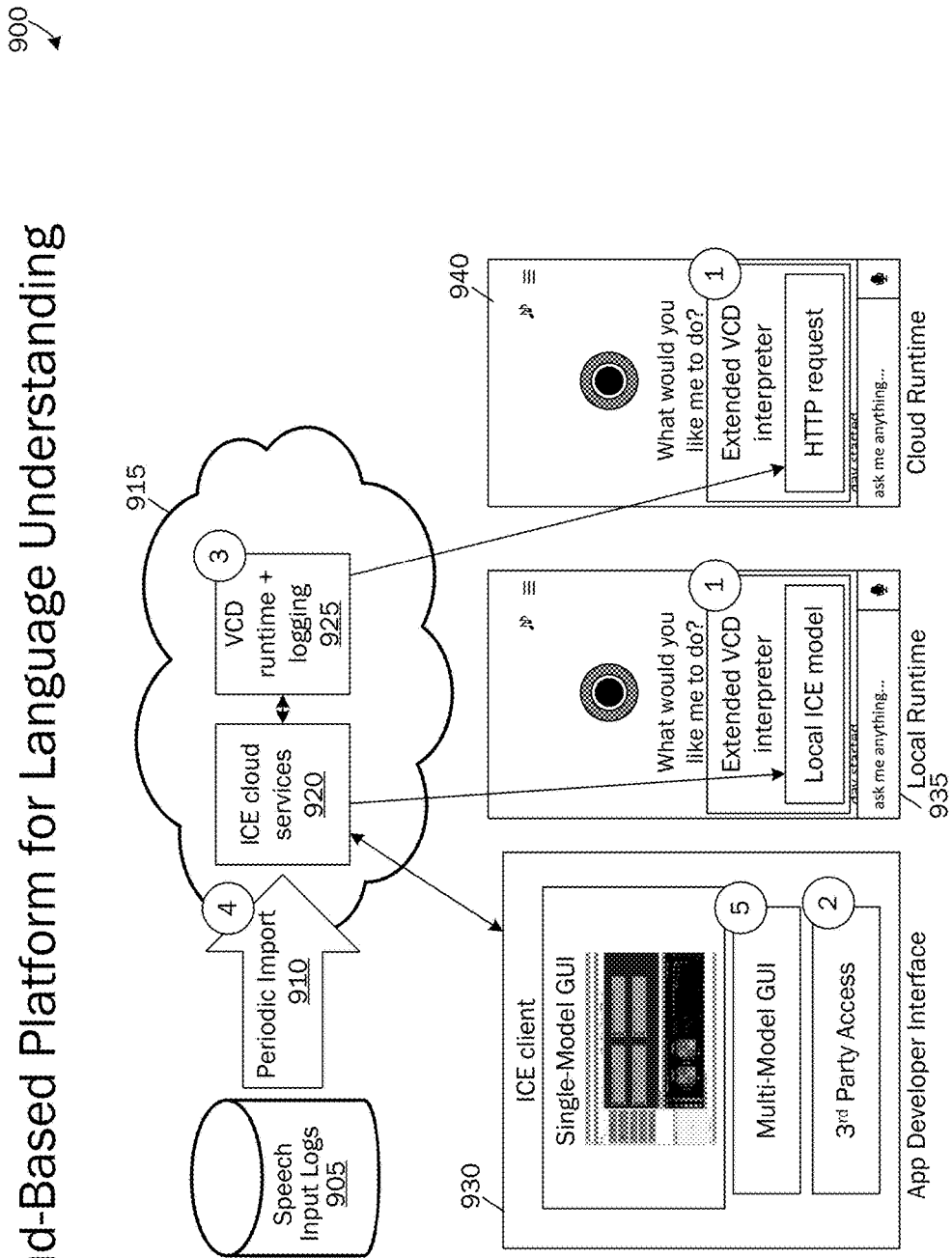
FIG. 9 illustrates a cloud-based platform for the language understanding system or device illustrated in FIG. 2.
Figure 10:
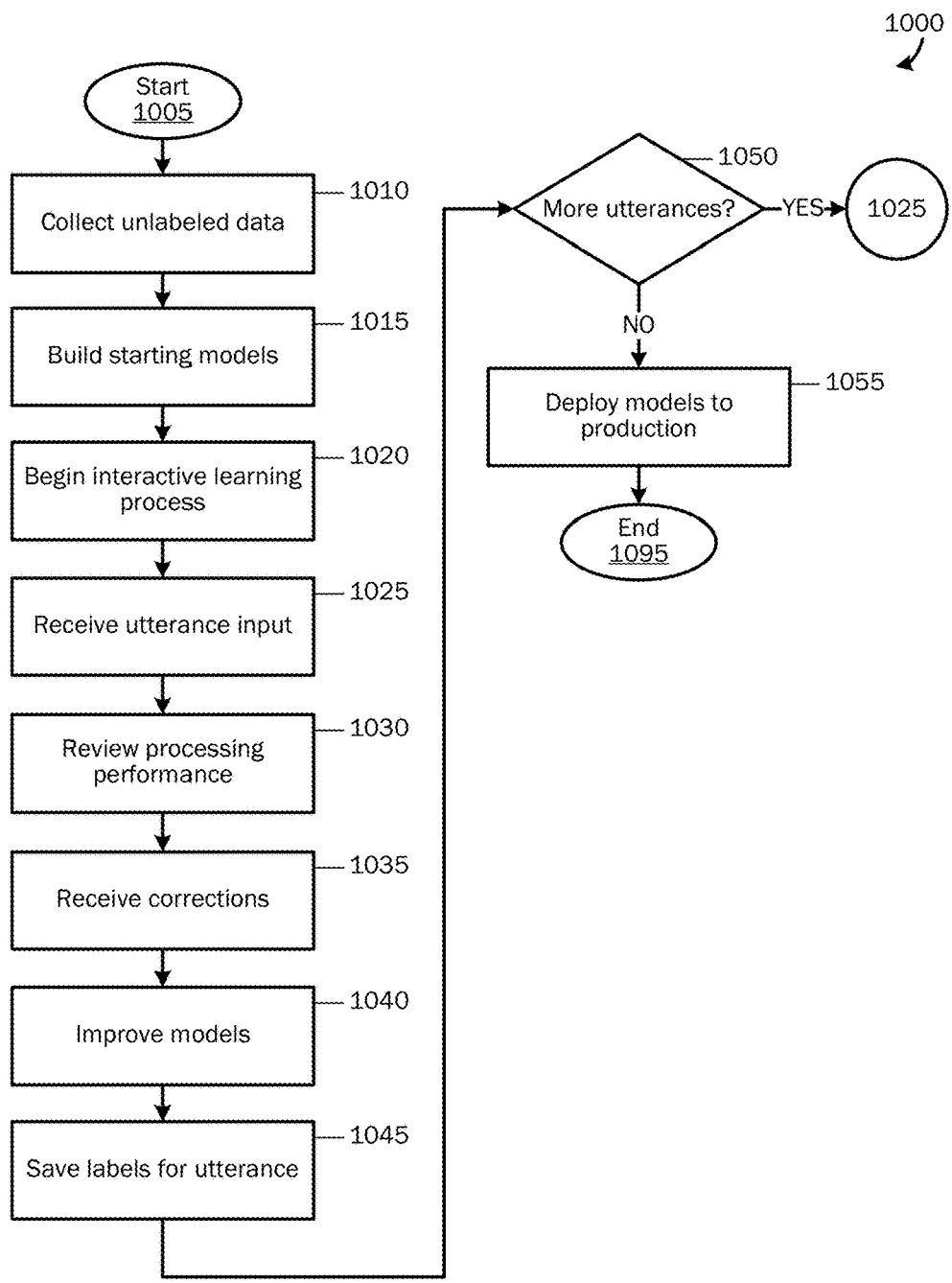
FIG. 10 is a flowchart illustrating a method for generating a language understanding model according to examples.

As described above with reference to FIG. 2, the language understanding system 205 may operate as a standalone system or may operate as a cloud-based system that may be accessed by developers via a distributed computing system such as the Internet. Referring now to FIG. 9, a cloud-based platform 900 for the language understanding system 205 is illustrated and described. According to examples, a simple schema 940 for representing language understanding tasks which compatible with existing voice command definition (VCD) files is provided. The VCD runtime may be extended to handle ICE models, described above. Third party access 940 is enabled to ICE tool via a web-based interface via the Internet 290, 915 or other distributed computing environment such as an intranet. The cloud service 930 is set up and developed intent and entity extraction and/or resolution models are run in the cloud-based implementation. Utterance logs/storage 210, 905 are maintained at cloud-based systems. Models are run and interactive learning for models is performed as described above via web-based interfaces by remote developers. Utterances are available for immediate correction in the ICE tool. Utterances may be periodically imported 910 from general speech input logs 210, 905. In the ICE tool add user interfaces may be added for receiving labels for utterances that contain multiple models from across disparate computing systems and developers.

Having described an exemplary operating environment for examples above with respect to FIGS. 1 through 9, FIG. 10 is a flowchart illustrating a method for generating a language understanding model according to examples. The method 1000 begins at start operation 1005 and proceeds to operation 1010 wherein a corpus of unlabeled data is collected as either type-written data or spoken utterances and is stored in the database 210, 905, as described above with reference to FIGS. 2 and 9.

At operation 1015, an intent module 220, an entity extraction module 225 and an entity resolution module 230 are used to build one or more intent models 221, entity extraction models 226 and entity resolution models 231 for beginning the process of interactive learning for the models for ultimate use in generating function calls for passing to a receiving application. At this operation, each of the models may be built in isolation with initial modeling around initially labeled words or phrases extracted from received input. Alternatively, the models may be built together using the end-to-end pipeline process 206.

At operation 1020, the models 221, 226, 231 are passed through an end-to-end interactive learning process 206 as described above for iteratively and interactively improving the operating performance of each of the generated models. At operation 1025, a first utterance of interest is tested against each of the intent detection models, entity extraction models and entity resolution models, as required, for beginning the interactive learning process, as described above with reference to FIGS. 2 and 6.

According to one aspect, choosing an utterance of interest may be any utterance a developer of the models chooses to begin the process. For example, one type of utterance of interest may be an utterance from a real person received at the database (logs) 210, 905 for which a label has not previously been generated or for which a label is not anticipated from the models in their current operating performance state. Another reason that an utterance may be considered as an utterance of interest may include an utterance that is known to be unlabeled at the present time but is known to be associated with a functionality that is expected to be added to the conversational system in the near future. As should be appreciated, an utterance of interest for use as part of the interactive learning process for the being-developed models 221, 226, 231 may be selected according to a variety of reasons as desired by the developer generating the models.

At operation 1030, the first entered utterance of interest is processed by the processing pipeline 206 and the results of the processing may be provided to the developer in accordance with the user interface 600, as described above. At operation 1035, in response to processing output for the entered utterance of interest, the developer may make corrections.

At operation 1040, after corrections for processing errors are made, labels generated for entities extracted from the entered utterance of interest and are saved for the determined user intent and for determined entities from the processed utterance of interest. For example, referring back to FIG. 1, for the utterance "turn on the outside lights," a label of "turn on" 140 may be saved for the utterance for the intent detection model 221, and the entity "outside lights" 145 may be saved for entities extracted from the phrase. The process between operations 1025 through 1045 may be repeated iteratively with succeeding utterances of interest until the generated intent detection module 221, entity extraction module 226, and entity resolution module 231 reach a statistically acceptable operating performance, as described above.

At operation 1050, the generated and interactively improved models 221, 226, 231 may be placed into production 1055, and as production data are received and processed by the models 221, 226, 231, the received data may be run back through operations 1025 through 1040 for further teaching the models 221, 226, 231 for continuing to improve their performances. Once the models 221, 226, 231 are performing at a statistically acceptable performance level, then output from each of the models may be utilized for building a function call for passing to an application for executing a desired function as described herein. The method 1000 ends at operation 1095.

While examples have been described in the general context of program modules that execute in conjunction with an application program that runs on an operating system on a computer, those skilled in the art will recognize that the examples may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which examples may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 11:
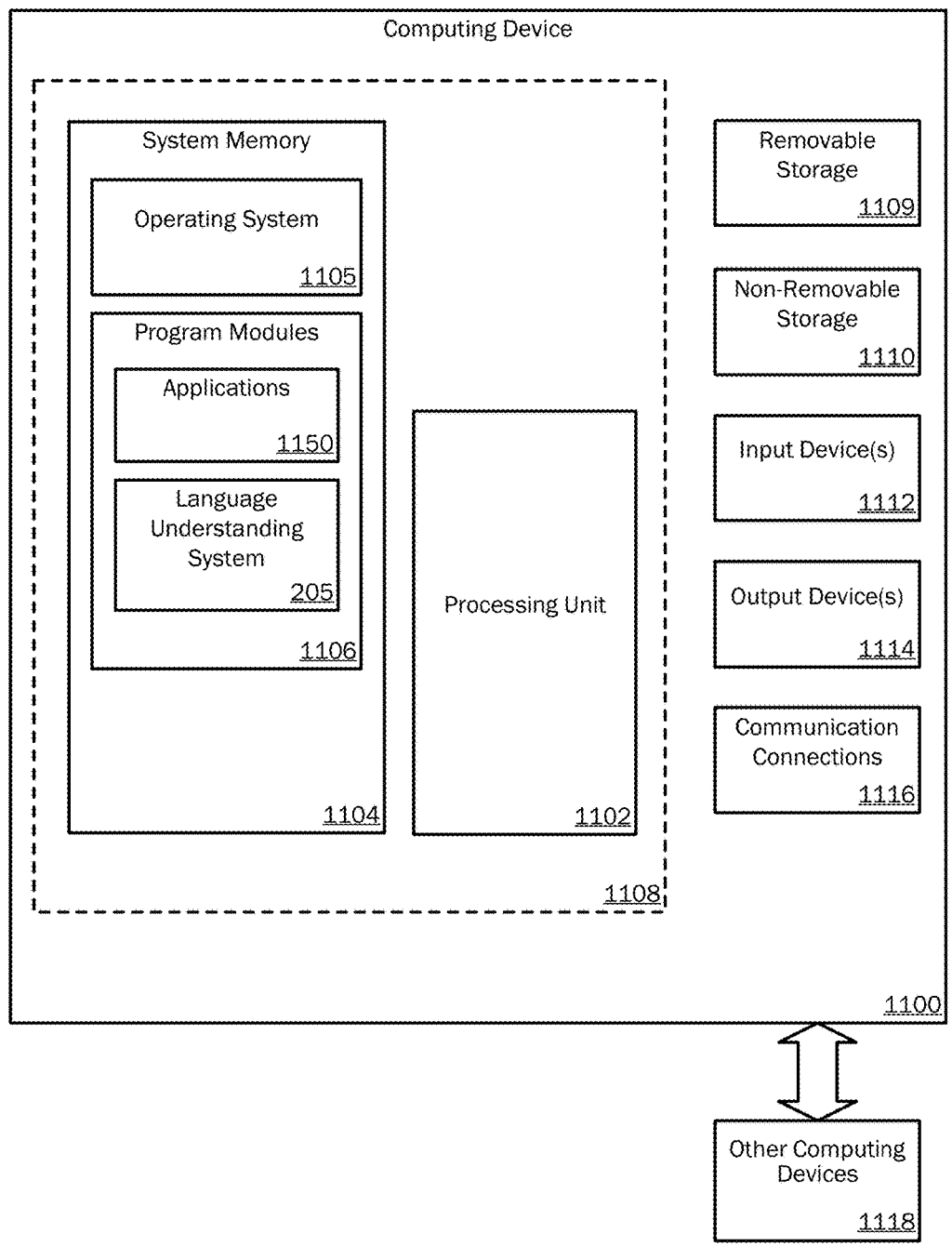
FIG. 11 is a block diagram illustrating example physical components of a computing device with which examples may be practiced.
Figure 12A:
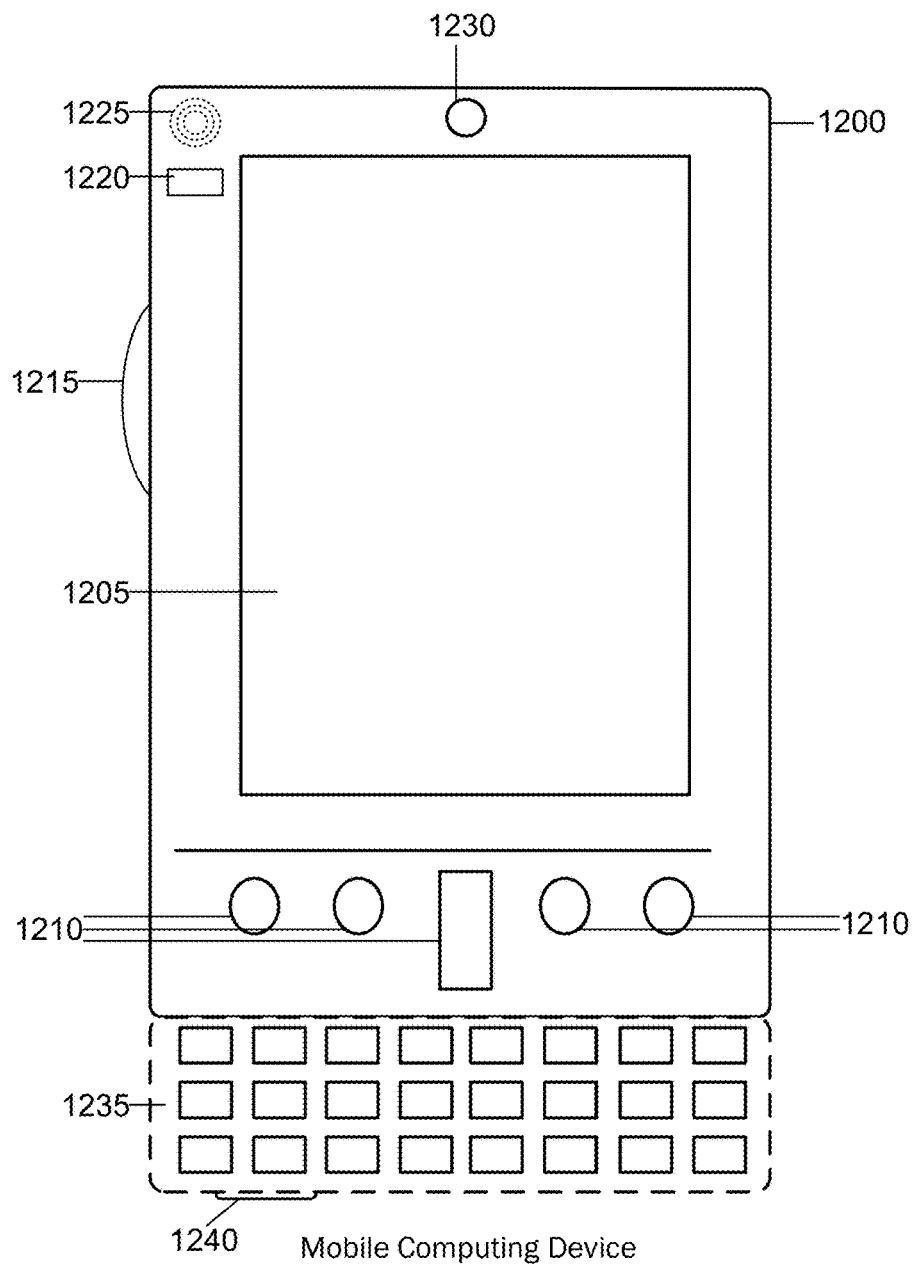
FIGS. 12A and 12B are simplified block diagrams of a mobile computing device with which examples may be practiced.
Figure 12B:
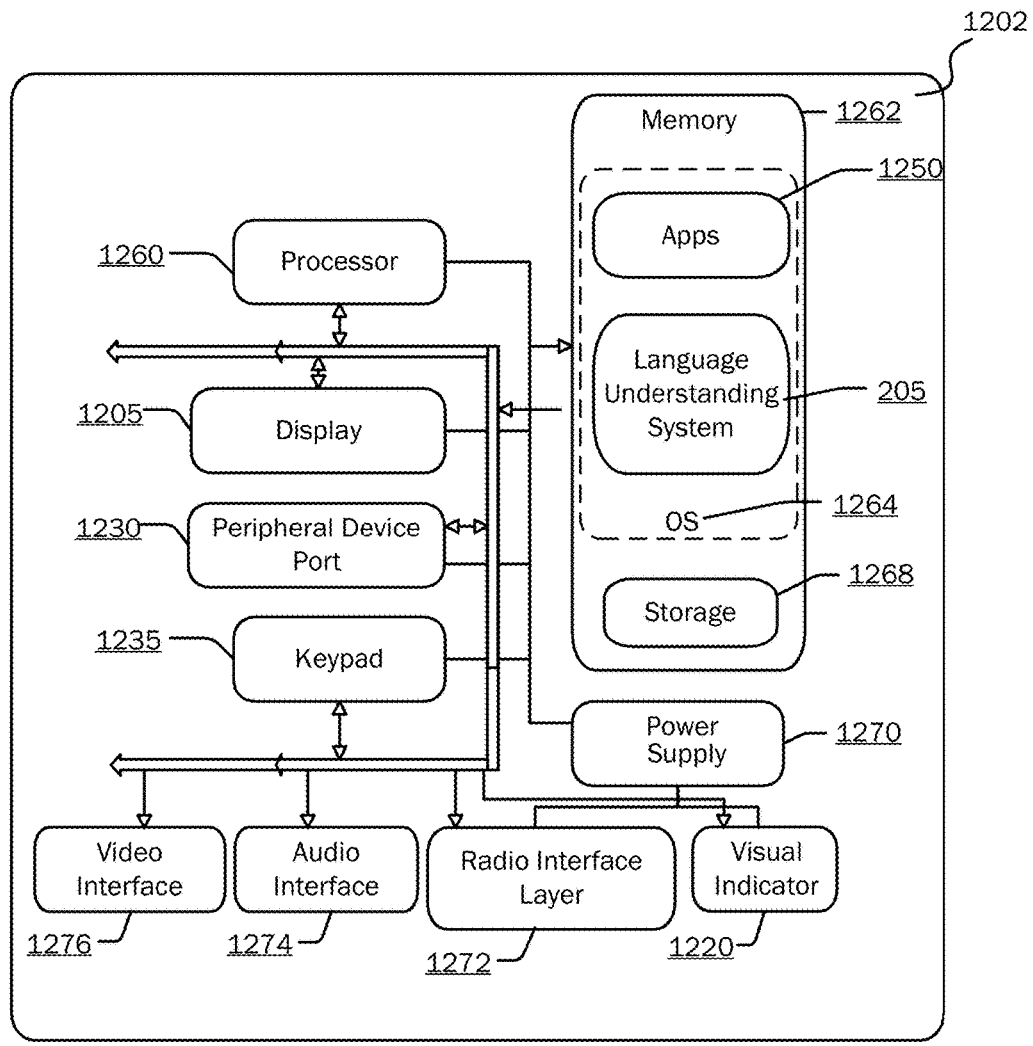
Figure 13:
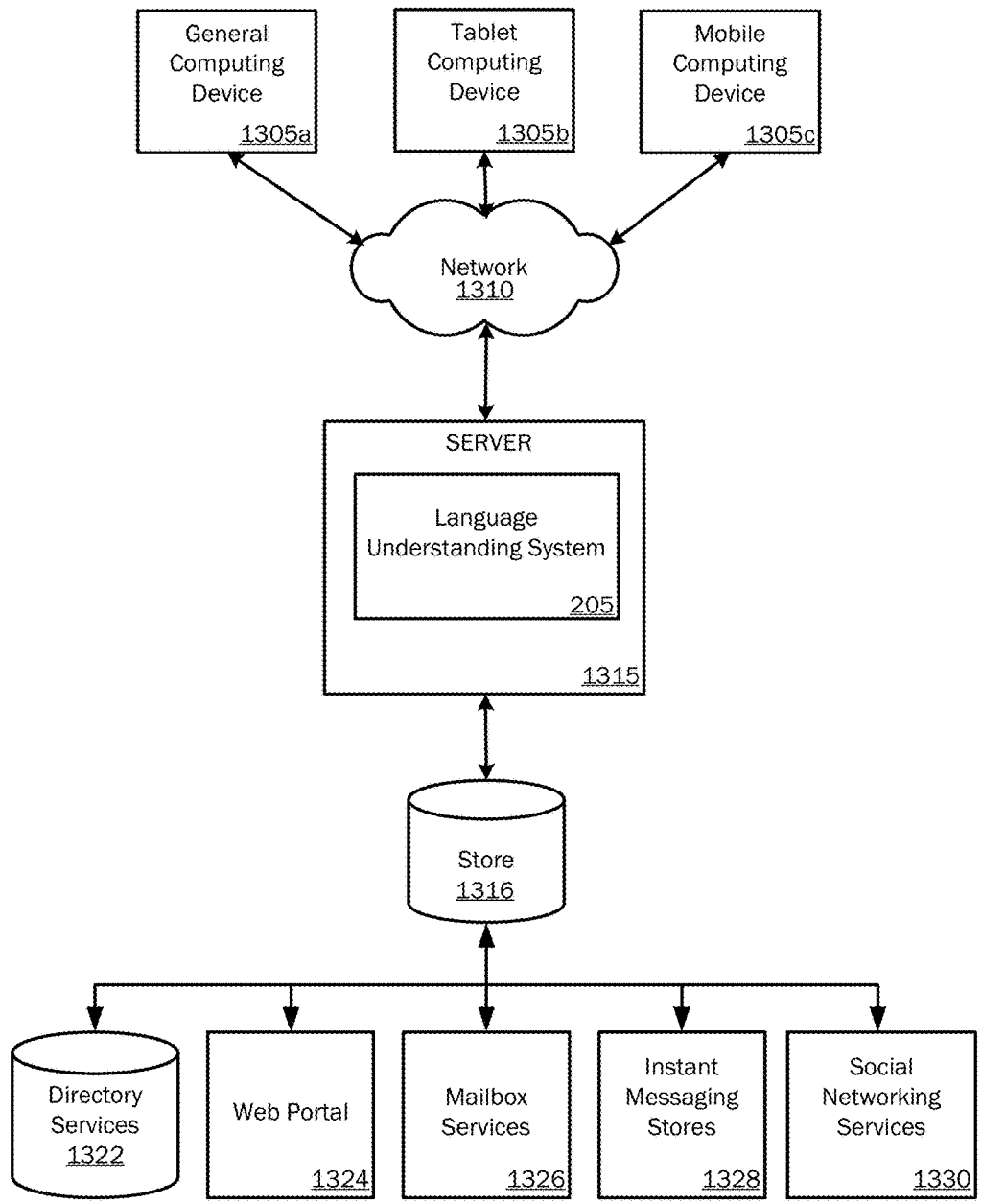
FIG. 13 is a simplified block diagram of a distributed computing system in which examples may be practiced.

FIGS. 11-13 and the associated descriptions provide a discussion of a variety of operating environments in which examples may be practiced. However, the devices and systems illustrated and discussed with respect to FIGS. 11-13 are for purposes of example and illustration and are not limiting of a vast number of computing device configurations that may be utilized for practicing examples, described herein.

FIG. 11 is a block diagram illustrating physical components (i.e., hardware) of a computing device or system 205, 1100 with which examples may be practiced. The computing device components described below may be suitable for the client devices or systems 205, 275, 280 and the computing components of the system 900 described above with reference to FIGS. 1-9. In a basic configuration, the computing devices or systems 205, 275, 280, 900, 1100 may include at least one processing unit 1102, 255 and a system memory 1104, 260. Depending on the configuration and type of computing device, the system memory 1104, 260 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1150. The operating system 1105, for example, may be suitable for controlling the operation of the computing devices or systems 205, 275, 280, 900, 1100. Furthermore, examples may be practiced in conjunction with a graphics library, other operating systems, or any other application program and is not limited to any particular application or system. This basic configuration is illustrated in FIG. 11 by those components within a dashed line 1108. The computing devices or systems 205, 275, 280, 900, 1100 may have additional features or functionality. For example, the computing devices or systems 205, 275, 280, 900, 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules, including the language understanding system or device 205 and modules 206, 220, 225, 230 and data files may be stored in the system memory 1104. While executing on the processing unit 1102, the program modules 1106 may perform processes including, but not limited to, one or more of the stages of the method 1000 illustrated in FIG. 10. Other program modules that may be used in accordance with examples and may include applications such as electronic mail and contacts applications, word processing applications, spreadsheet applications, database applications, slide presentation applications, drawing or computer-aided application programs, etc.

Furthermore, examples may be practiced in an electrical circuit comprising discrete electronic elements, packaged or integrated electronic chips containing logic gates, a circuit utilizing a microprocessor, or on a single chip containing electronic elements or microprocessors. For example, examples may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an activity stream across multiple workloads may be operated via application-specific logic integrated with other components of the computing device 1100 on the single integrated circuit (chip). Examples may also be practiced using other technologies capable of performing logical operations such as, for example, AND, OR, and NOT, including but not limited to mechanical, optical, fluidic, and quantum technologies. In addition, examples may be practiced within a general purpose computer or in any other circuits or systems.

The computing devices or systems 205, 275, 280, 900, 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing devices systems 205, 275, 280, 900, 1100. Any such computer storage media may be part of the computing devices systems 205, 275, 280, 900, 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A and 12B illustrate a mobile computing device 280, 1200, for example, a mobile telephone, a smart phone, a tablet personal computer, a laptop computer, and the like, with which examples may be practiced. With reference to FIG. 12A, one aspect of a mobile computing device 280, 1200 for implementing the aspects is illustrated. In a basic configuration, the mobile computing device 280, 1200 is a handheld computer having both input elements and output elements. The mobile computing device 280, 1200 typically includes a display 1205 and one or more input buttons 1210 that allow the user to enter information into the mobile computing device 280, 1200. The display 1205 of the mobile computing device 280, 1200 may also function as an input device (e.g., a touch screen display). If included, an optional side input element 1215 allows further user input. The side input element 1215 may be a rotary switch, a button, or any other type of manual input element. In alternative aspects, mobile computing device 280, 1200 may incorporate more or less input elements. For example, the display 1205 may not be a touch screen in some aspects. In yet another alternative aspect, the mobile computing device 280, 1200 is a portable phone system, such as a cellular phone. The mobile computing device 280, 1200 may also include an optional keypad 1235. Optional keypad 1235 may be a physical keypad or a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some aspects, the mobile computing device 280, 1200 incorporates a vibration transducer for providing the user with tactile feedback. In yet another aspect, the mobile computing device 1200 incorporates peripheral device 1240, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 280, 1200 can incorporate a system (i.e., an architecture) 1202 to implement some aspects. In one aspect, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1250, including the language understanding system 205 and associated modules may be loaded into the memory 1262 and run on or in association with the operating system 1264. Examples of the application programs include phone dialer programs, electronic communication applications, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs via the operating system 1264, and vice versa.

The visual indicator 1220 may be used to provide visual notifications and/or an audio interface 1274 may be used for producing audible notifications via the audio transducer 1225. In the illustrated aspect, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with examples, the microphone may also serve as an audio sensor to facilitate control of notifications, as will be described below. The system 1202 may further include a video interface 1276 that enables an operation of an on-board camera 1230 to record still images, video stream, and the like.

A mobile computing device 280, 1200 implementing the system 1202 may have additional features or functionality. For example, the mobile computing device 280, 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 280, 1200 and stored via the system 1202 may be stored locally on the mobile computing device 280, 1200, as described above, or the data may be stored on any number of storage media that may be accessed by the device via the radio 1272 or via a wired connection between the mobile computing device 280, 1200 and a separate computing device associated with the mobile computing device 280, 1200, for example, a server computer in a distributed computing network, such as the Internet. As should be appreciated such data/information may be accessed via the mobile computing device 280, 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 13 illustrates one aspect of the architecture of a system for providing the functionality described herein across components of a distributed computing environment. Content developed, interacted with, or edited in association with the applications described above may be stored in different communication channels or other storage types. For example, various documents may be stored using a directory service 1322, a web portal 1324, a mailbox service 1326, an instant messaging store 1328, or a social networking site 1330. The application/system/device 205 (e.g., an electronic communication application/language understanding system) may use any of these types of systems or the like for providing the functionalities described herein across multiple workloads, as described herein. A server 1315 may provide the functionality to clients 1305A-C. As one example, the server 1315 may be a web server providing the application functionality described herein over the web. The server 1315 may provide the application functionality over the web to clients 1305A-C through a network 1310. By way of example, a client computing device may be implemented and embodied in a personal computer 1305A, a tablet computing device 1305B and/or a mobile computing device 1305C (e.g., a smart phone), or other computing device. Any of these aspects of the client computing device may obtain content from the store 1316.

An additional example includes but is not limited to a method for providing language understanding, comprising: collecting, by a computer, one or more unlabeled utterances; extracting, by a computer, from the one or more unlabeled utterances a user intent and one or more language entities; building, by a computer, a user intent detection model based on the user intent for finding user intents in subsequent utterances responsive to the user intent model; building, by a computer, an entity extraction model based on the one or more language entities for finding language entities in the subsequent utterances responsive to the entity extraction model; testing a first of additional unlabeled utterances against the user intent detection model and the entity extraction model; receiving labeling of user intents and language entities found in the first of the additional unlabeled utterances from the user intent detection model and the entity extraction model; and in response to receiving corrections to the labeling of user intents and language entities found in the first of the additional unlabeled utterances, processing a second of the additional unlabeled utterances based on corrections received to the labeling of user intents and language entities for improving performance of the user intent detection model and entity extraction model.

Another example includes but is not limited to a language understanding system, comprising: one or more device operating components including a processor and a memory; the one or more device operating components comprising a language processing pipeline operative to collect one or more unlabeled utterances; extract, by a user intent module and an entity extraction module, a user intent and one or more language entities from the one or more unlabeled utterances; build a user intent detection model based on the user intent for finding user intents responsive to the user intent model in subsequent utterances; build an entity extraction model based on the one or more language entities for finding language entities responsive to the entity extraction model in the subsequent utterances; test a first of additional unlabeled utterances against the user intent detection model and the entity extraction model; receive labeling of user intents and language entities found in the first of the additional unlabeled utterances from the user intent detection model and the entity extraction model; and process a second of the additional unlabeled utterances based on corrections received to the labeling of user intents and language entities found in the first of the additional unlabeled utterances for improving performance of the user intent detection model and entity extraction model.

Examples are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope as claimed in any way. The aspects, examples, and details provided in this application are considered sufficient to convey possession and enable others to make and use the best mode. The claims should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claims.

We claim:

1. A method for providing language understanding on a computer, comprising:
   receiving an utterance;
   building, by the computer, two separate models in isolation from one another, the building of the two separate models comprising:
      building a user intent detection model based on a user intent determined from the received utterance, the user intent detection model for determining a user intent in a subsequent utterance, wherein the user intent detection model is updateable via interactive learning to identify an unlabeled user intent associated with functionality within an associated application;
      building an entity extraction model based on one or more language entities determined from the received utterance, the entity extraction model for determining one or more language entities in the subsequent utterance, wherein the entity extraction model is updateable via interactive learning to identify unlabeled language entities associated with functionality within the associated application;
   automatically generating labeling for the user intent and the one or more language entities determined from the received utterance;
   building a function call for calling a function in the associated application from the automatically generated labeling;
   wherein in response to receiving the subsequent utterance:
      the user intent detection model and the entity extraction model are applied against the subsequent utterance to identify, based on the automatically generated labeling for the subsequent utterance, the function call;
      the function call is passed to the associated application to execute the function on the computer; and
      the function is executed by the associated application on the computer.

2. The method of claim 1, further comprising storing the automatically generated labeling for subsequent use for labeling the user intent and the one or more language entities extracted from the subsequent utterance.

3. The method of claim 1, prior to building, by the computer, the two separate models in isolation from one another, determining the user intent from one or more words extracted from the received utterance.

4. The method of claim 3, prior to building, by the computer, the two separate models in isolation from one another, determining the one or more language entities from one or more words extracted from the received utterance.

5. The method of claim 4, further comprising converting the received utterance from speech to text prior to extracting one or more words from the utterance.

6. The method of claim 1, further comprising:
   receiving a correction to the labeling automatically generated for one or both of the user intent and the one or more language entities determined from the subsequent utterance; and
   updating, by the computer, one or both of the user intent detection model and the entity extraction model based on the received correction to the automatically generated labeling.

7. The method of claim 6, further comprising:
   re-applying the user intent detection model and the entity extraction model against the subsequent utterance after updating, by the computer, one or both of the user intent detection model and the entity extraction model based on the received correction to the automatically generated labeling; and
   automatically generating an updated labeling for the user intent and for the one or more language entities determined from the subsequent utterance.

8. The method of claim 6, further comprising:
   processing the subsequent utterance against the user intent detection model and the entity extraction model after updating, by the computer, one or both of the user intent detection model and the entity extraction model based on the received correction to the automatically generated labeling.

9. The method of claim 1, further comprising prior to automatically generating the labeling for the one or more language entities determined from the subsequent utterance, resolving one or more of the one or more language entities to canonical identifications for one or more of the one or more language entities.

10. The method of claim 1, further comprising:
    wherein a plurality of results are received from the associated application in response to the function call, ranking the plurality of results received from the associated application based on a correlation of the received results with the labeling for the user intent and for the one or more language entities used for building the function call.

11. The method of claim 1, wherein the received utterance is broken into one or more words contained therein based on pauses and common word patterns.

12. The method of claim 1, wherein a given language entity of the one or more language entities includes a span of one or more words into which the received utterance has been broken.

13. The method of claim 1, wherein a given language entity from the one or more language entities is resolved into a canonical form for a known entity.

14. A method for providing language understanding on a computer, comprising:

extracting, by the computer, from one or more unlabeled utterances a user intent and one or more language entities;

building, by the computer, two separate models in isolation from one another, the building of the two separate models comprising:

building a user intent detection model based on the user intent extracted from the one or more unlabeled utterances for determining user intents in subsequent utterances, wherein the user intent detection model is updateable via interactive learning to identify an unlabeled user intent associated with functionality within an associated application;

building an entity extraction model based on the one or more language entities extracted from the one or more unlabeled utterances for determining language entities in the subsequent utterances, wherein the entity extraction model is updateable via interactive learning to identify unlabeled language entities associated with functionality within the associated application;

testing a first of additional unlabeled utterances against the user intent detection model and the entity extraction model;

automatically generating labeling for a user intent and one or more language entities determined from the first of the additional unlabeled utterances upon application of the user intent detection model and the entity extraction model;

generating a function call associated with a desired function identified from the automatically generated labeling; and passing the function call to an application for execution of the desired function and obtaining one or more results, wherein the desired function is executed by the application.

15. The method of claim 14, further comprising storing the automatically generated labeling for subsequent use for labeling a user intent and one or more language entities extracted from other unlabeled utterances.

16. The method of claim 14, further comprising:

receiving a correction to the automatically generated labeling for one or both of the user intent and the one or more language entities determined from the first of the additional unlabeled utterances; and updating, by the computer, one or both of the user intent detection model and the entity extraction model based on the received correction to the automatically generated labeling.

17. The method of claim 16, further comprising:

re-testing the first of the additional unlabeled utterances against the user intent detection model and the entity extraction model after updating, by the computer, one or both of the user intent detection model and the entity extraction model based on the received correction to the automatically generated labeling; and automatically generating an updated labeling for the user intent and for the one or more language entities determined from the first of the additional unlabeled utterances upon application of the user intent detection model and the entity extraction model for improving performance of the user intent detection model and the entity extraction model.

18. The method of claim 16, further comprising:

processing a second of the additional unlabeled utterances against the user intent detection model and the entity extraction model after updating, by the computer, one or both of the user intent detection model and the entity extraction model based on the received correction to the automatically generated labeling.

19. The method of claim 14, prior to extracting, by the computer, the user intent and the one or more language entities from the one or more unlabeled utterances, collecting, by the computer, the one or more unlabeled utterances and converting the one or more unlabeled utterances from speech to text from which one or more individual words are extracted for use in determining the user intent and the one or more language entities.

20. A language understanding system, comprising:

one or more processors; and a memory coupled to the one or more processors and storing instructions that, when executed by the one or more processors, cause the language understanding system to:

receive an utterance;

build two separate models in isolation from one another, the building of the two separate models comprising to:

build a user intent detection model based on a user intent determined from the received utterance, the user intent detection model for determining a user intent in a subsequent utterance, wherein the user intent detection model is updateable via interactive learning to identify an unlabeled user intent associated with functionality within an application; and build an entity extraction model based on one or more language entities determined from the received utterance, the entity extraction model for determining one or more language entities in the subsequent utterance, wherein the entity extraction model is updateable via interactive learning to identify unlabeled language entities associated with functionality within the application;

wherein, in response to receiving the subsequent utterance, the user intent detection model and the entity extraction model are applied against the subsequent utterance for automatically generating labeling for the user intent and for the one or more language entities determined from the subsequent utterance, wherein a function call associated with a desired function identified from the automatically generated labeling for the user intent and for the one or more language entities determined from the subsequent utterance is generated by the language understanding system, and wherein the function call is passed by the language understanding system to the application running on a computer for execution of the desired function and obtaining one or more results; and wherein the application running on the computer executes the desired function.

\* \* \* \* \*